(12) United States Patent
Sako

(10) Patent No.: US 10,552,094 B2
(45) Date of Patent: Feb. 4, 2020

(54) PRINTING APPARATUS AND METHOD OF CONNECTING TO REMOTE PRINT SERVICE

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/029,286

(22) Filed: Jul. 6, 2018

(65) Prior Publication Data
US 2019/0018622 A1    Jan. 17, 2019

(30) Foreign Application Priority Data

Jul. 11, 2017    (JP) ................................ 2017-135428

(51) Int. Cl.
*G06F 3/12* (2006.01)
*H04L 29/12* (2006.01)

(52) U.S. Cl.
CPC .......... *G06F 3/1204* (2013.01); *G06F 3/1207* (2013.01); *G06F 3/1231* (2013.01); *G06F 3/1256* (2013.01); *G06F 3/1287* (2013.01); *H04L 61/1541* (2013.01)

(58) Field of Classification Search
None
See application file for complete search history.

(56) References Cited

U.S. PATENT DOCUMENTS

| | | | |
|---|---|---|---|
| 8,867,070 B2 | 10/2014 | Jazayeri | |
| 2009/0268225 A1* | 10/2009 | Sugiyama | G06F 3/1203 358/1.14 |
| 2011/0235085 A1* | 9/2011 | Jazayeri | G06F 3/1204 358/1.14 |
| 2013/0346510 A1* | 12/2013 | Mohit | G06Q 10/107 709/206 |
| 2016/0227071 A1* | 8/2016 | Asakura | H04N 1/32496 |

* cited by examiner

*Primary Examiner* — Andrew H Lam
(74) *Attorney, Agent, or Firm* — Canon U.S.A., Inc., IP Division

(57) ABSTRACT

A printing apparatus is provided such that, if a publication state of the printing apparatus in a cloud print service indicates public, a URL for registering the printing apparatus to a public printer is acquired and the acquired URL is enabled to be output from the printing apparatus.

18 Claims, 20 Drawing Sheets

| USER NAME | Email ADDRESS |
|---|---|
| Alice | alice@gmail.com |
| Bob | bob@gmail.com |
| Carol | carol@gmail.com |

PRINTING APPARATUS AND METHOD OF CONNECTING TO REMOTE PRINT SERVICE

BACKGROUND OF THE INVENTION

Field of the Invention

The present disclosure relates to a printing apparatus, an information processing method, and a recording medium.

Description of the Related Art

In printing services in related art, users directly transmit print jobs from client terminals, such as personal computers (PCs), to printing apparatuses to realize printing.

In contrast, cloud print services provided on the Internet are proposed in recent years.

FIG. 1 illustrates an exemplary cloud print processing sequence. In the example illustrated in FIG. 1, it is supposed that a printing apparatus 101 supports a cloud print function and a client terminal 100 supports a cloud print client function. A cloud print service 102 indicates a cloud print service on the Internet.

First, the client terminal 100 transmits a cloud print service registration request 111 to the printing apparatus 101. A cloud account 109, which is a user identifier of the service, is included in the cloud print service registration request 111. Upon reception of the cloud print service registration request 111, the printing apparatus 101 transmits a cloud print service registration request 112 to the cloud, print service 102. The cloud account 109 included in the cloud print service registration request 111 and a unique printer ID 108 of the printing apparatus 101 are included in the cloud print service registration request 112. Upon reception of the cloud print service registration request 112, the cloud print service 102 associates the cloud account 109 with the printer ID 108, included in the cloud print service registration request 112, and registers the printing apparatus 101 as a cloud print executable printing apparatus. At this time, the cloud account 109 is registered as an owner of the printing apparatus 101, who is capable of making various settings, such as a public setting or an unpublished setting, of the printing apparatus 101. The cloud print service 102 returns the result of the registration to the printing apparatus 101 as a cloud print service registration response 113. Upon reception of the cloud print service registration response 113, the printing apparatus 101 returns the content of the cloud print service registration response 113 to the client terminal 100 as a cloud print service registration response 114. Upon reception of the cloud print service registration response 114, the client terminal 100 recognizes the printing apparatus 101 as the cloud print executable printing apparatus.

The client terminal 100 transmits print data 115 to a logic printer corresponding to the printing apparatus 101 on the cloud print service 102 using the cloud, account 109 in response to an operation by a user. The cloud print service 102 converts the received print data 115 into a data format in which the printing apparatus 101 is capable of printing. The cloud print service 102 transmits print data 116 resulting from conversion to the printing apparatus 101. The printing apparatus 101 prints out the received print data 116.

U.S. Pat. No. 8,867,070 discloses a configuration of the cloud print service.

In addition, methods of publishing a printing apparatus registered in the cloud print service 102 as a public printer are proposed. A printing apparatus published as the public printer receives a cloud print service from an arbitrary user who knows unique uniform resource locator (URL) information that is issued in the publication. FIG. 2 illustrates a method of publishing a printing apparatus as a public printer. Referring to FIG. 2, the client terminal 100 transmits a printing apparatus publication request 201, which is a request to publish the printing apparatus, to the cloud print service 102 using the printer ID 108 and the cloud account 109, which is the owner of the printing apparatus 101. Upon reception of the printing apparatus publication request 201, the cloud print service 102 enables a public printer setting of the printing apparatus 101. The cloud print service 102 generates a printing apparatus registration URL 210 including random key information necessary to add a public printer and the printer ID 108 of the printing apparatus 101. The cloud print service 102 transmits a printing apparatus publication response 202 including the printing apparatus registration URL 210 to the client terminal 100. The owner of the printing apparatus 101, who is operating the client terminal 100, notifies a user who is operating a client terminal 200, of the printing apparatus registration URL 210. The user who is operating the client terminal 200 logs in the cloud print service 102 from, for example, a Web browser, using the own cloud account 209 to access the printing apparatus registration URL 210 and transmits a printing apparatus registration request 203. The cloud print service 102 adds the printing apparatus 101 as a printer available for the cloud account 209. The cloud print service 102 returns the result indicating that the printing apparatus 101 has been registered to the client terminal 200 as a printing apparatus registration response 204.

The client terminal 200 transmits print data 215 to a logic printer corresponding to the printing apparatus 101 on the cloud print service 102 using the cloud account 209 based on an operation by the user. The cloud print service 102 converts the received print data 215 into a data format in which the printing apparatus 101 is capable of printing. The cloud print service 102 transmits print data 216 resulting from conversion to the printing apparatus 101. The printing apparatus 101 prints out the received print data 216.

There are cases in which printing apparatuses are used as public printers in the cloud print services in the related art. In order to use such a public printer, it is necessary to make an inquiry to the owner of the printing apparatus to get a printing apparatus registration URL.

SUMMARY OF THE INVENTION

The present disclosure provides a printing apparatus including a memory device that stores a set of instructions and at least one processor that executes the set of instructions to acquire a uniform resource locator used to issue a printing instruction to the printing apparatus via a cloud print service composed of one or more servers if state information indicating a state of the printing apparatus indicates that the printing apparatus is published in the cloud print service and to enable the acquired uniform resource locator to be output from the printing apparatus.

Further features of the present invention will become apparent from the following description of exemplary embodiments with reference to the attached drawings.

DESCRIPTION OF THE EMBODIMENTS

Embodiments of the present disclosure will herein be described with reference to the drawings.

First Embodiment

Figure 1:
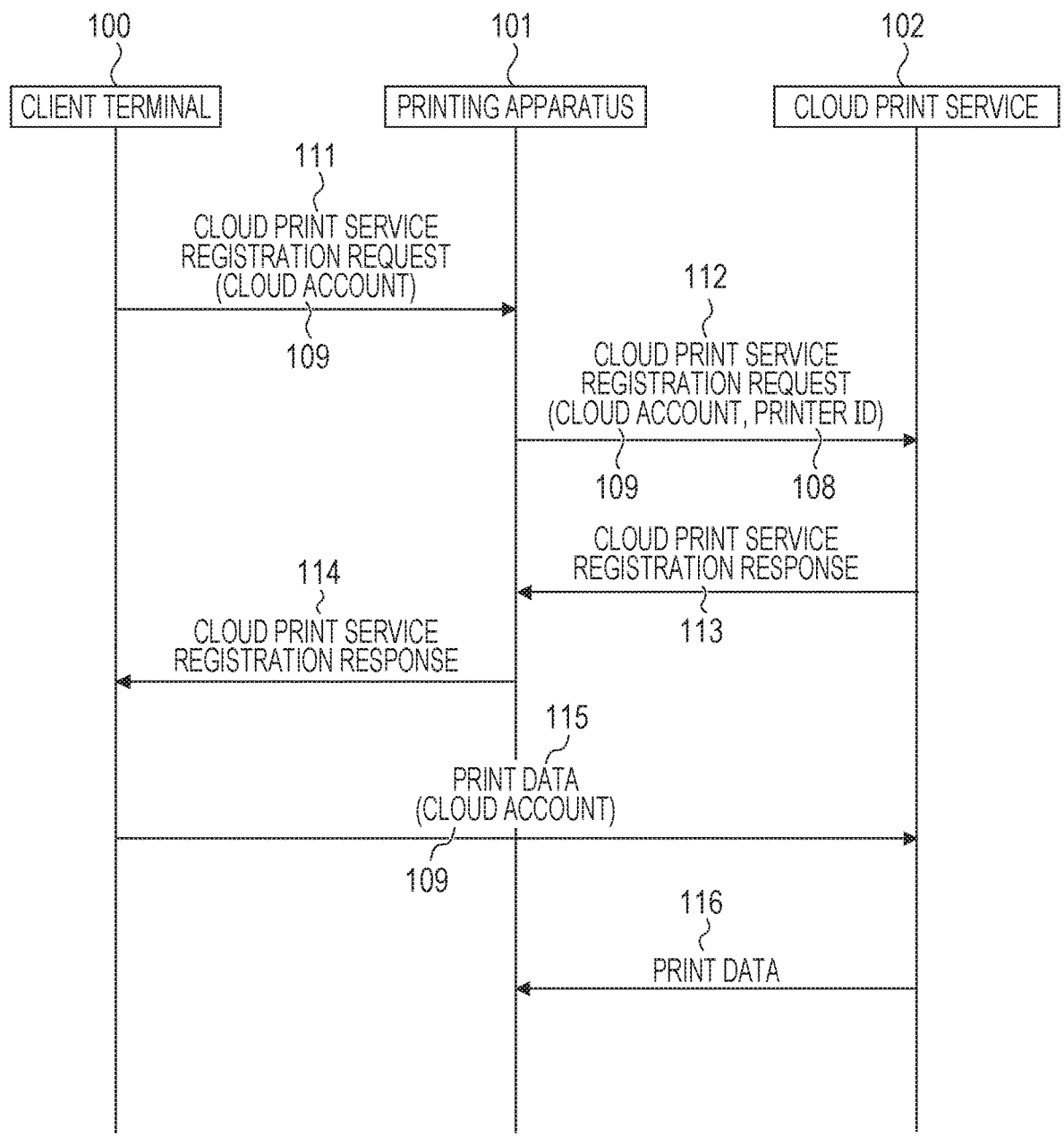
FIG. 1 illustrates an exemplary cloud, print processing sequence.
Figure 2:
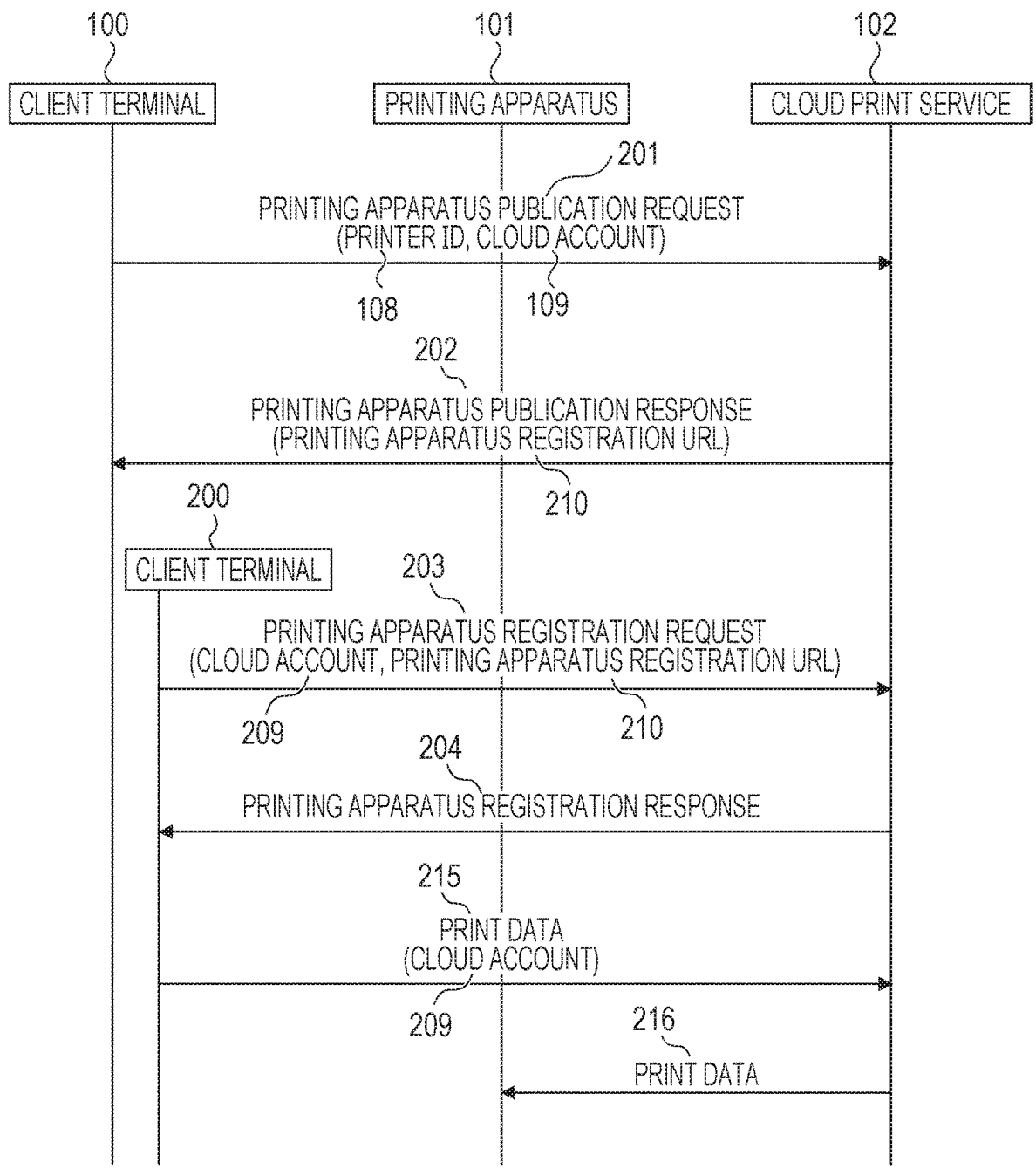
FIG. 2 illustrates a method of publishing a printing apparatus as a public printer.
Figure 3:
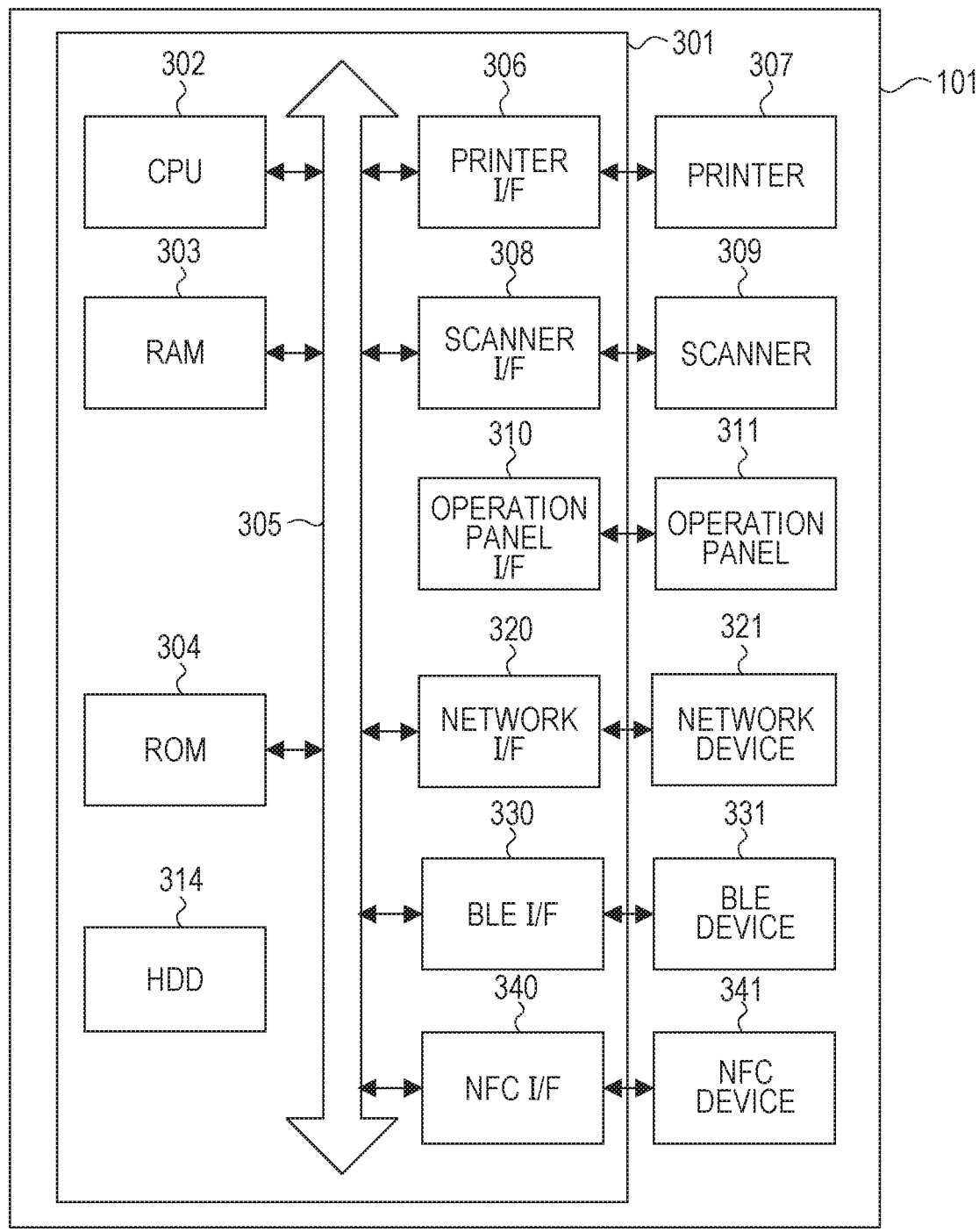
FIG. 3 is a block diagram illustrating an exemplary hardware configuration of a printing apparatus according to a first embodiment.

FIG. 3 is a block diagram illustrating an exemplary hardware configuration of the printing apparatus 101 according to a first embodiment. Referring to FIG. 3, a control unit 301 including a central processing unit (CPU) 302 controls the operation of the entire printing apparatus 101. The CPU 302 reads out programs stored in a read only memory (ROM) 304 to perform a variety of control including communication control. A random access memory (RAM) 303 is used as a main memory of the CPU 302 and a temporary storage area, such as a working area. A hard disk drive (HDD) 314 stores data and various programs or various information tables.

A printer interface (I/F) 306 serves as an interface that outputs an image signal to a printer 307 (printer engine). A scanner interface (I/F) 308 serves as an interface that receives an image signal scanned by a scanner 309 (scanner engine). The CPU 302 processes the image signal supplied from the scanner interface 308 and supplies the image signal to the printer interface 306 as a recording image signal.

An operation panel interface (I/F) 310 connects an operation panel 311 to the control unit 301. A liquid crystal display having a touch panel function, a keyboard, and so on are provided in the operation panel 311. A network interface (I/F) 320 transmits information to an external terminal, such as the client terminal 100 or the cloud print service 102, via a network device 321 and receives a variety of information from the external terminal.

A Bluetooth how Energy (BLE) interface (I/F) 330 transmits information to an external terminal, such as the client terminal 200, via a BLE device 331.

A Near Field Communication (NFC) interface (I/F) 340 transmits information to an external terminal, such as the client terminal 200, via an NFC device 341.

The blocks in the control unit 301 are connected to each other via a system bus 305.

The CPU 302 performs processing based on the programs stored in the ROM 304 or the HDD 314 to realize a software configuration of the printing apparatus 101, described below with reference to FIG. 4, and processes in flowcharts described below with reference to FIG. 7, FIG. 8, FIG. 10, FIG. 12, FIG. 14, and FIG. 16. In addition, the CPU 302 performs processing based on the programs stored in the ROM 304 or the HDD 314 to realize processes of the printing apparatus 101 in sequence diagrams described below with reference to FIG. 6, FIG. 19, and FIG. 20.

Figure 4:
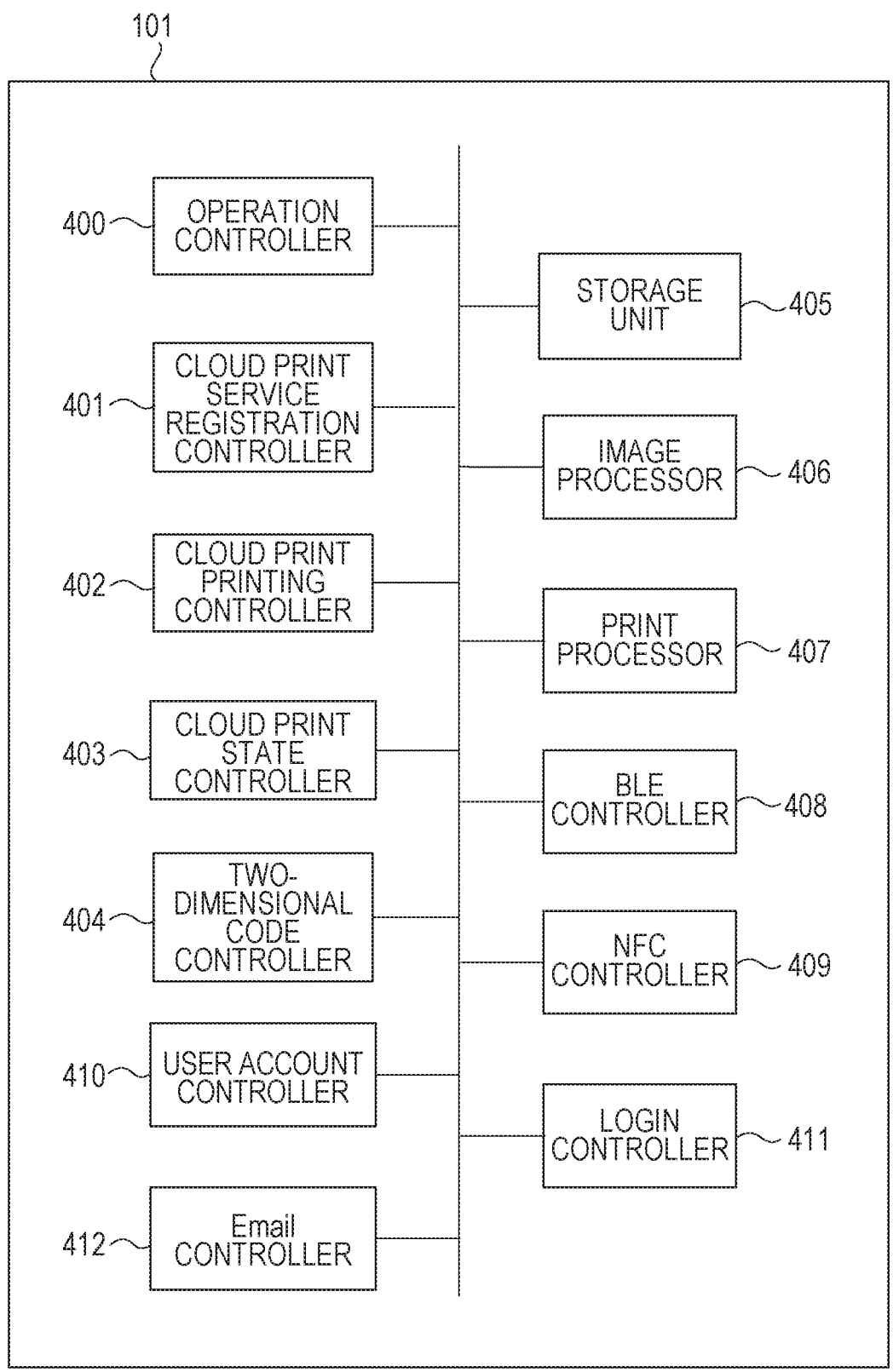
FIG. 4 is a block diagram illustrating an exemplary software configuration of the printing apparatus according to the first embodiment.

FIG. 4 is a block diagram illustrating an exemplary software configuration of the printing apparatus 101.

Referring to FIG. 4, an operation controller 400 controls the operation panel 311. The operation controller 400 displays an operation menu on the operation panel 311 to wait for an instruction input by a user, notifies other functional blocks of the content of the accepted instruction, and displays the result of the instruction on the operation panel 311.

A cloud print service registration controller 401 analyzes the cloud print service registration request 111 received from the client terminal 100 and transmits the cloud print service registration request 112 to the cloud print service 102. The cloud print service registration controller 401 controls a cloud print service registration process in the above manner. In the embodiments, the cloud print service is composed of one or multiple servers.

A cloud print printing controller 402 controls a process to transfer the print data 116 received from the cloud print service 102 to an image processor 406 along with a printing instruction.

A cloud print state controller 403 controls a process to, for example, receive publication setting information about the printing apparatus, received from the cloud print service 102, and to generate a two-dimensional code in the printing apparatus using the information. This publication setting information is state information indicating the state of the printing apparatus. When the publication setting information indicates "public", the publication setting information indicates that the printing apparatus is published in the cloud print service.

A two-dimensional code controller 404 controls a process to convert the printing apparatus registration URL 210 received from the cloud print service 102 into a two-dimensional code. This URL is used to issue the printing instruction from the client terminal 100 to the printing apparatus 101 via the cloud print service 102. This URL is used to associate a user account in the cloud print service with the printing apparatus. This user account corresponds to the user of the printing apparatus 101.

A BLE controller 408 controls a process to transmit the printing apparatus registration URL 210 received from the cloud print service 102 using a BLE beacon signal.

A NFC controller 409 controls a process to transmit the printing apparatus registration URL 210 received from the cloud print service 102 as NFC data exchange format (NDEF) data.

A storage unit 405 stores specified data in the ROM 304 or the HDD 314 in response to an instruction from another functional block or reads out data stored in the ROM 304 or the HDD 314. The data managed in the storage unit 405 is exemplified by the publication setting information about the printing apparatus.

The image processor 406 performs rendering of a print job into image data for printing.

A print processor 407 performs a process to transmit the image data subjected to the rendering in the image processor 406 to the printer 307 via the printer interface 306 as an image signal for printing. A user account controller 410 manages user account information stored in the storage unit 405.

A login controller 411 controls a login process to the printing apparatus 101 using the user account information managed by the user account controller 410.

An Email controller 412 controls a process in which the printing apparatus 101 transmits an Email (electronic mail) using an Email address included in the user account information managed by the user account controller 410. The Email is an example of a mail.

Figure 5:
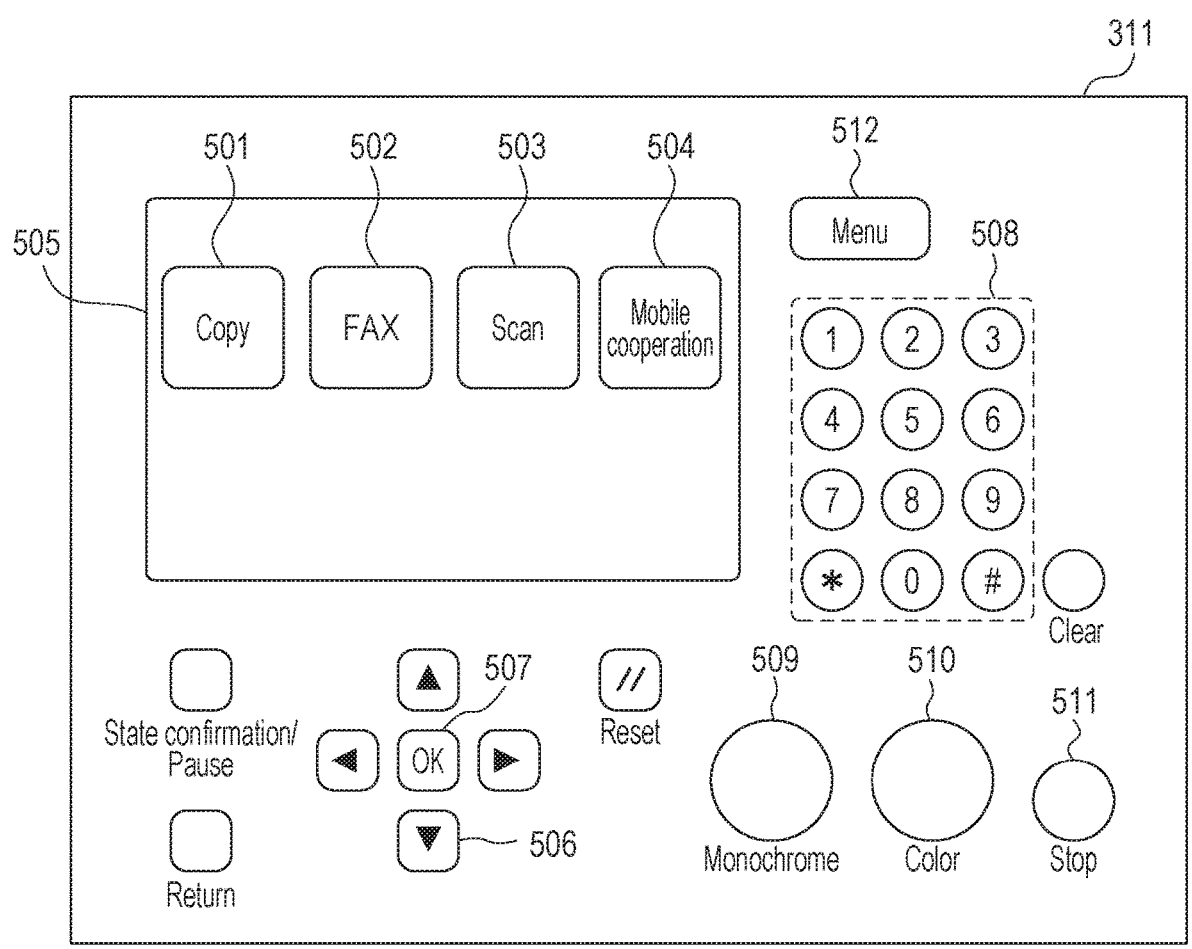
FIG. 5 illustrates an exemplary operation panel in the printing apparatus according to the first embodiment.

FIG. 5 illustrates an example of the operation panel 311 in the printing apparatus 101. Referring to FIG. 5, a display panel 505 is a display panel using, for example, a liquid crystal display (LCD). A button 501 is selected to perform copying using the printing apparatus 101. Selection of the button 501 by the user displays a copy operation screen on the display panel 505. A button 502 is selected to transmit a facsimile using the printing apparatus 101. Selection of the button 502 by the user displays a facsimile operation screen on the display panel printing apparatus 101. Selection of the button 503 by the user displays a scan operation screen on the display panel 505. A Mobile cooperation button 504 is selected to cooperate with a mobile device using the printing apparatus 101. Selection of the Mobile cooperation button 504 by the user displays information necessary for the cooperation with the mobile device on the display panel 505. A numeric keypad 508 is used by the user to input a number or the like. An OK key 507 is used by the user to, for example, determine the content of display on the display panel 505. Direction keys 506 are used by the user to, for example, select a menu or the like displayed on the display panel 505. Buttons 509 and 510 are used by the user to perform monochrome copy and color copy, respectively. A button 511 is used by the user to stop a process. A menu button 512 is used by the user to display a menu screen used to make settings of the printing apparatus 101.

Figure 6:
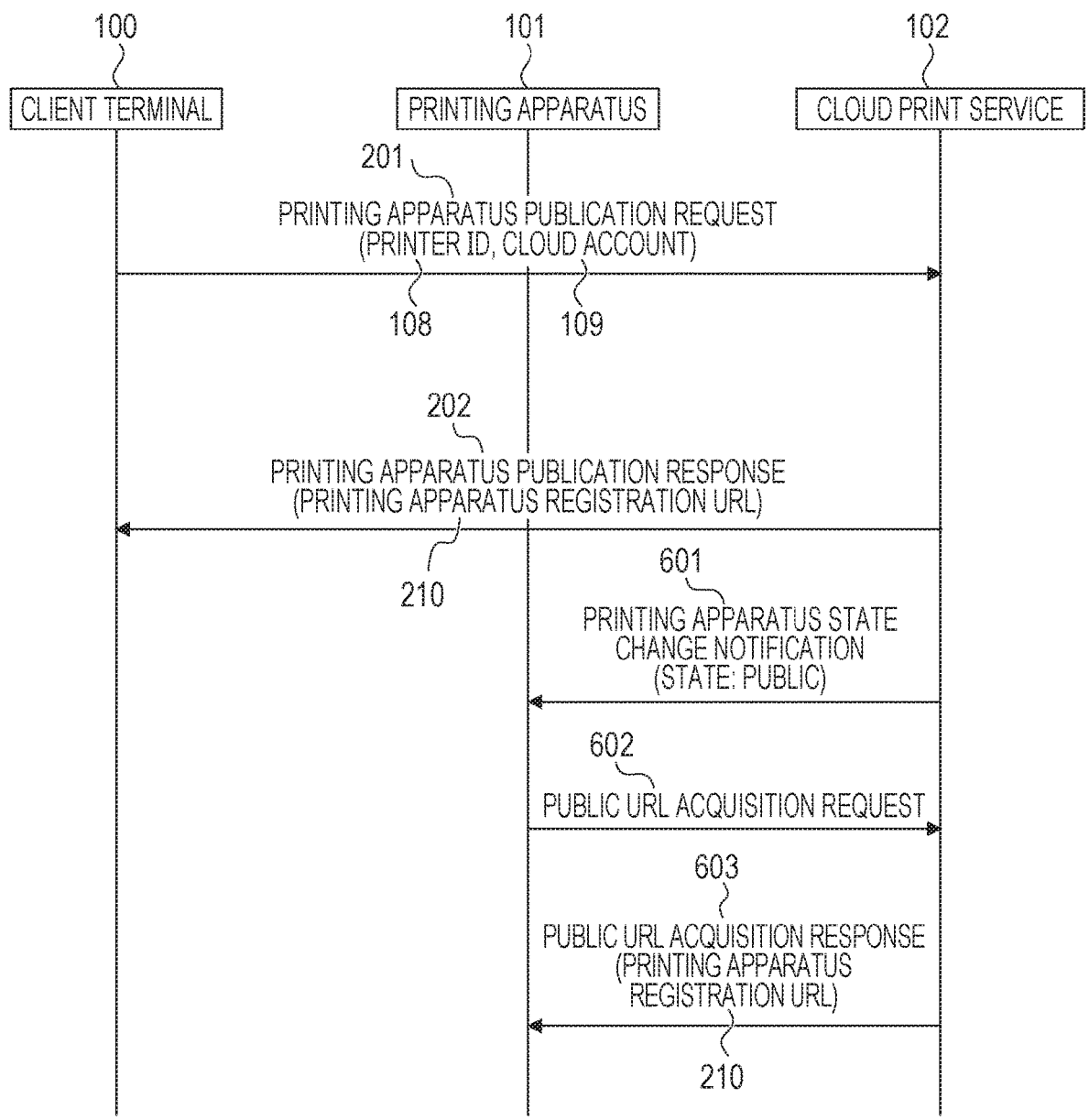
FIG. 6 is a sequence diagram illustrating an exemplary process to publish the printing apparatus as a public printer in the first embodiment.

FIG. 6 is a sequence diagram illustrating an exemplary process in which an owner of the printing apparatus 101 publishes the printing apparatus 101 as a public printer from the client terminal 100.

The client terminal 100 transmits the printing apparatus publication request 201, which is a request to publish the printing apparatus, to the cloud print service 102 using the printer ID 108 and the cloud account 109, which is the owner of the printing apparatus 101. Upon reception of the printing apparatus publication request 201, the cloud print service 102 enables a public printer setting of the printing apparatus 101. The cloud print service 102 generates the printing apparatus registration URL 210 including random key information necessary to add a public printer and the printer ID 108 of the printing apparatus 101 and transmits the printing apparatus publication response 202 including the printing apparatus registration URL 210 to the client terminal 100.

The cloud print service 102 transmits a printing apparatus state change notification 601 to the printing apparatus 101. Information indicating that the state of the printing apparatus is set to public is included in the printing apparatus state change notification 601.

The printing apparatus 101 transmits a public URL acquisition request 602 to the cloud print service 102.

The cloud print service 102 returns a public URL acquisition response 603 to the printing apparatus 101. The printing apparatus registration URL 210 for registering the printing apparatus 101 is included in the public URL acquisition response 603.

Figure 7:
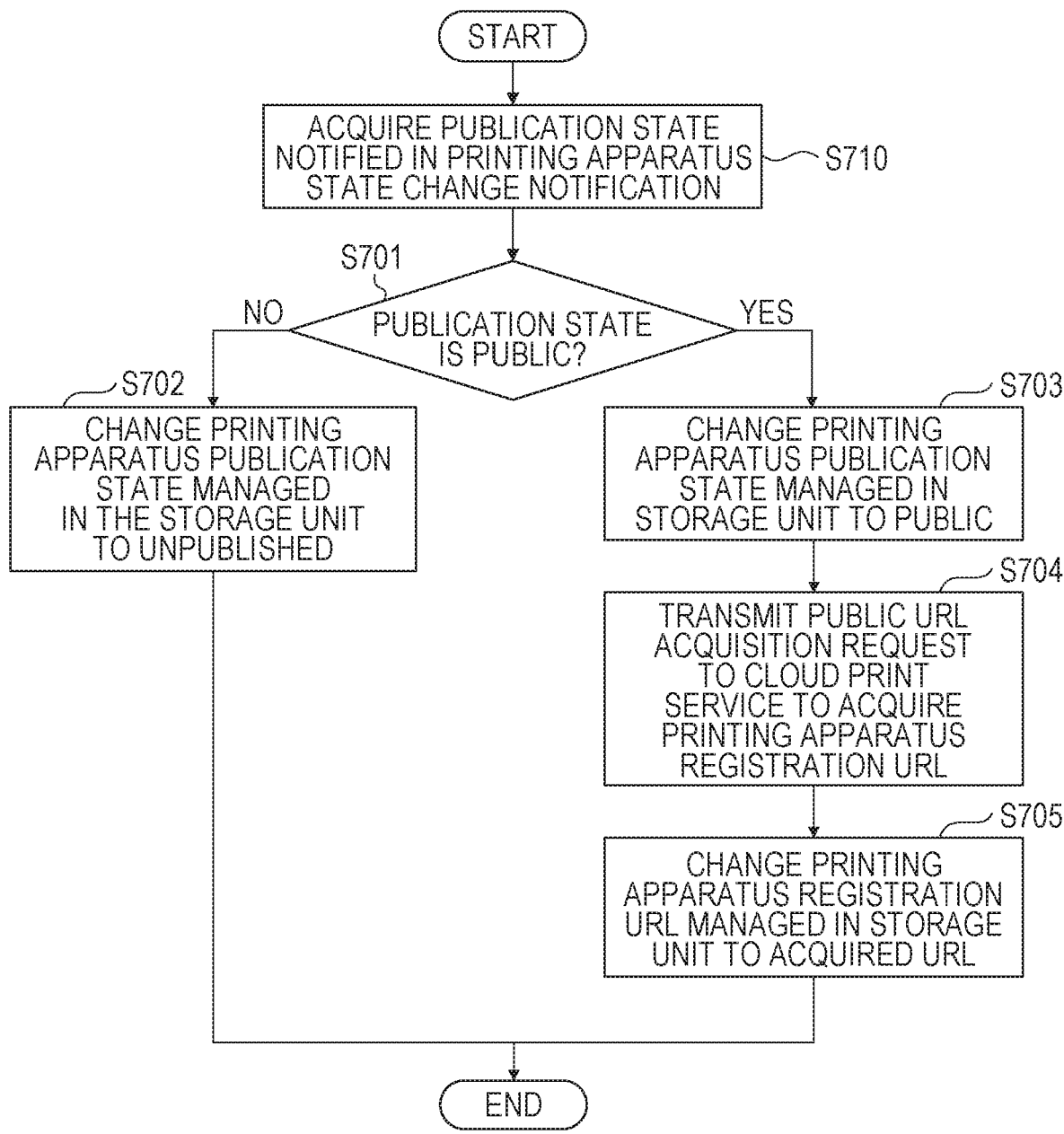
FIG. 7 is a flowchart illustrating exemplary information processing when a publication state is received in the first embodiment.

FIG. 7 is a flowchart illustrating exemplary information processing when the printing apparatus 101 receives a publication state in the printing apparatus state change notification 601.

Referring to FIG. 7, in Step S710, the cloud print state controller 403 acquires the publication state notified in the printing apparatus state change notification 601.

In Step S701, the cloud print state controller 403 determines whether the publication state is public. If the publication state is public (YES in Step S701), the processing goes to Step S703. If the publication state is unpublished (NO in Step S701), the processing goes to Step S702.

In Step 3702, the cloud print state controller 403 changes a printing apparatus publication state managed in the storage unit 405 to unpublished.

In Step S703, the cloud print state controller 403 changes the printing apparatus publication state managed in the storage unit 405 to public.

In Step S704, the cloud print state controller 403 transmits the public URL acquisition request 602 to the cloud print service 102 to acquire the printing apparatus registration URL 210 from the information notified in the response.

In Step S705, the cloud print state controller 403 changes the printing apparatus registration URL managed in the storage unit 405 to the printing apparatus registration URL 210 acquired in Step S704.

Figure 8:
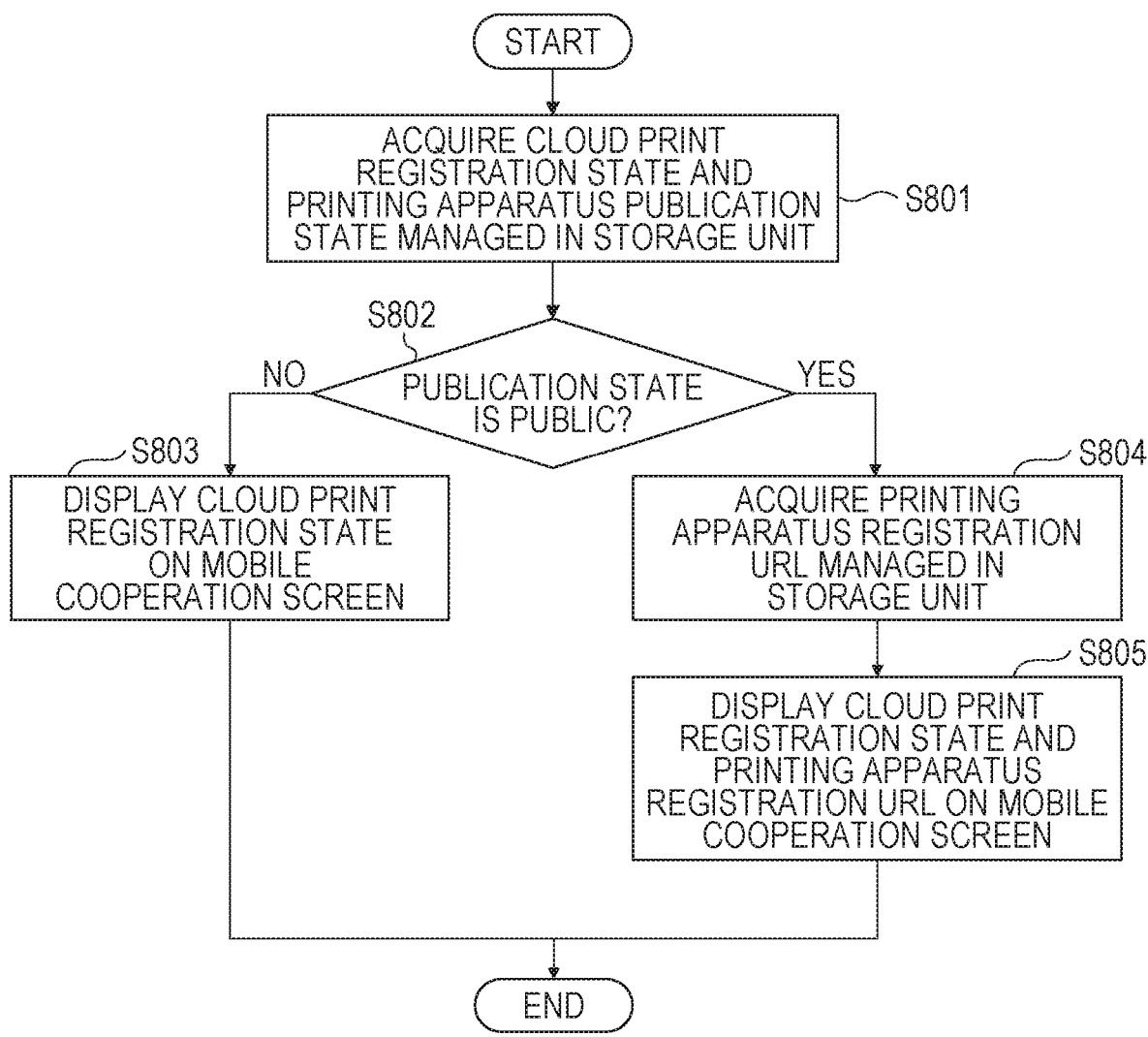
FIG. 8 is a flowchart illustrating exemplary information processing in the first embodiment.

FIG. 8 is a flowchart illustrating exemplary information processing when the Mobile cooperation button 504 is selected on the display panel 505 in the first embodiment.

Referring to FIG. 8, in Step S801, the operation controller 400 acquires a cloud print registration state and the printing apparatus publication state managed in the storage unit 405.

In Step S802, the operation controller 400 determines whether the printing apparatus publication state is public. If the printing apparatus publication state is public (YES in Step S802), the processing goes to Step S804. If the printing apparatus publication state is unpublished. (NO in Step S802), the processing goes to Step S803.

In Step S803, the operation controller 400 displays the cloud print registration state on a mobile cooperation screen.

In Step S804, the operation controller 400 acquires the printing apparatus registration URL managed in the storage unit 405.

In Step S805, the operation controller 400 displays the cloud print registration state and the printing apparatus registration URL on the mobile cooperation screen.

Figure 9:
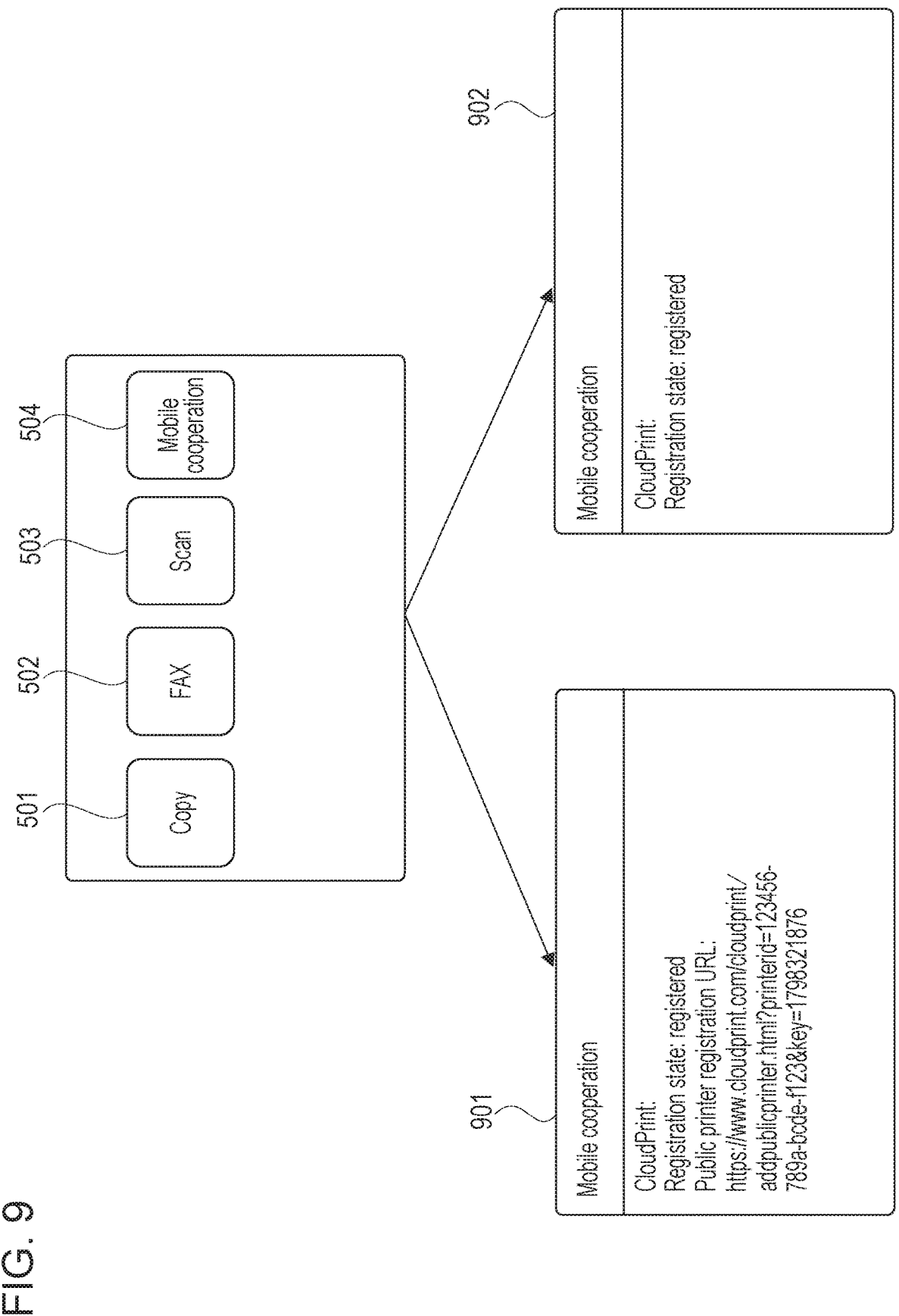
FIG. 9 illustrates an example of how the screen makes a transition in the first embodiment.

FIG. 9 illustrates an example of how the screen makes a transition when the Mobile cooperation button 504 is selected on the display panel 505 in the first embodiment.

A screen 902 is displayed by the operation controller 400 in Step 3803 in the flowchart illustrated in FIG. 8. The cloud print registration state read out from the storage unit 405 is displayed on the screen 902. A screen 901 is displayed by the operation controller 400 in Step S805 in the flowchart illustrated in FIG. 8. The cloud print registration state and the printing apparatus registration URL, which are read out from the storage unit 405, are displayed on the screen 901.

Second Embodiment

A process to convert the URL in the first embodiment into a two-dimensional code and display the two-dimensional code will be described in a second embodiment.

Figure 10:
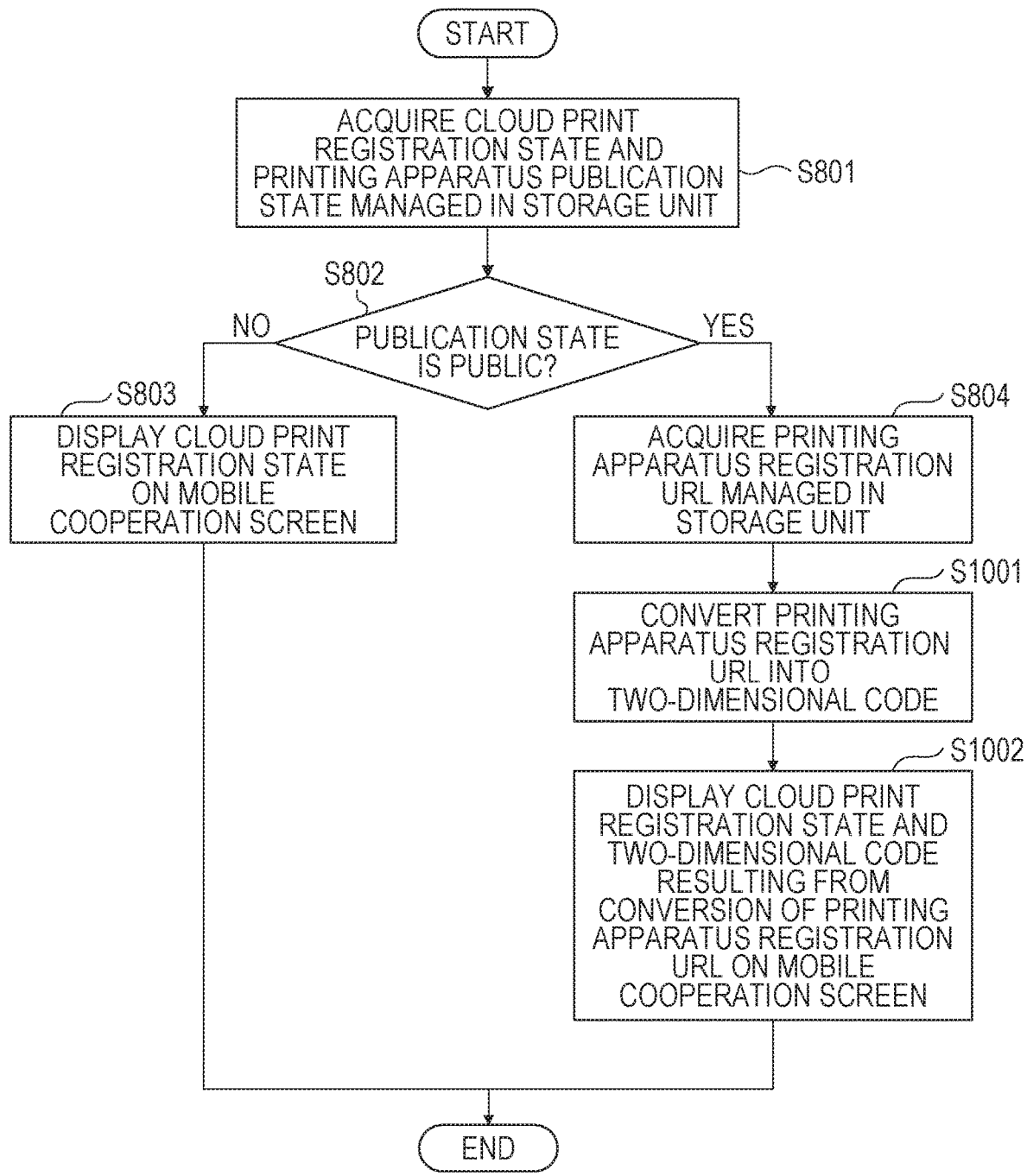
FIG. 10 is a flowchart illustrating exemplary information processing in a second embodiment.

FIG. 10 is a flowchart illustrating exemplary information processing when the Mobile cooperation button 504 is selected on the display panel 505 in the second embodiment. Since Steps S801 to S804 are the same as those in the flowchart illustrated in FIG. 8 in the first embodiment, a description of Steps S801 to S804 is omitted herein. Steps S1001 and S1002 will be described in the second embodiment.

In Step S1001, the two-dimensional code controller 404 converts the printing apparatus registration URL into a two-dimensional code.

In Step S1002, the operation controller 400 displays the cloud print registration state and the printing apparatus registration URL represented by the two-dimensional code on the mobile cooperation screen.

Figure 11:
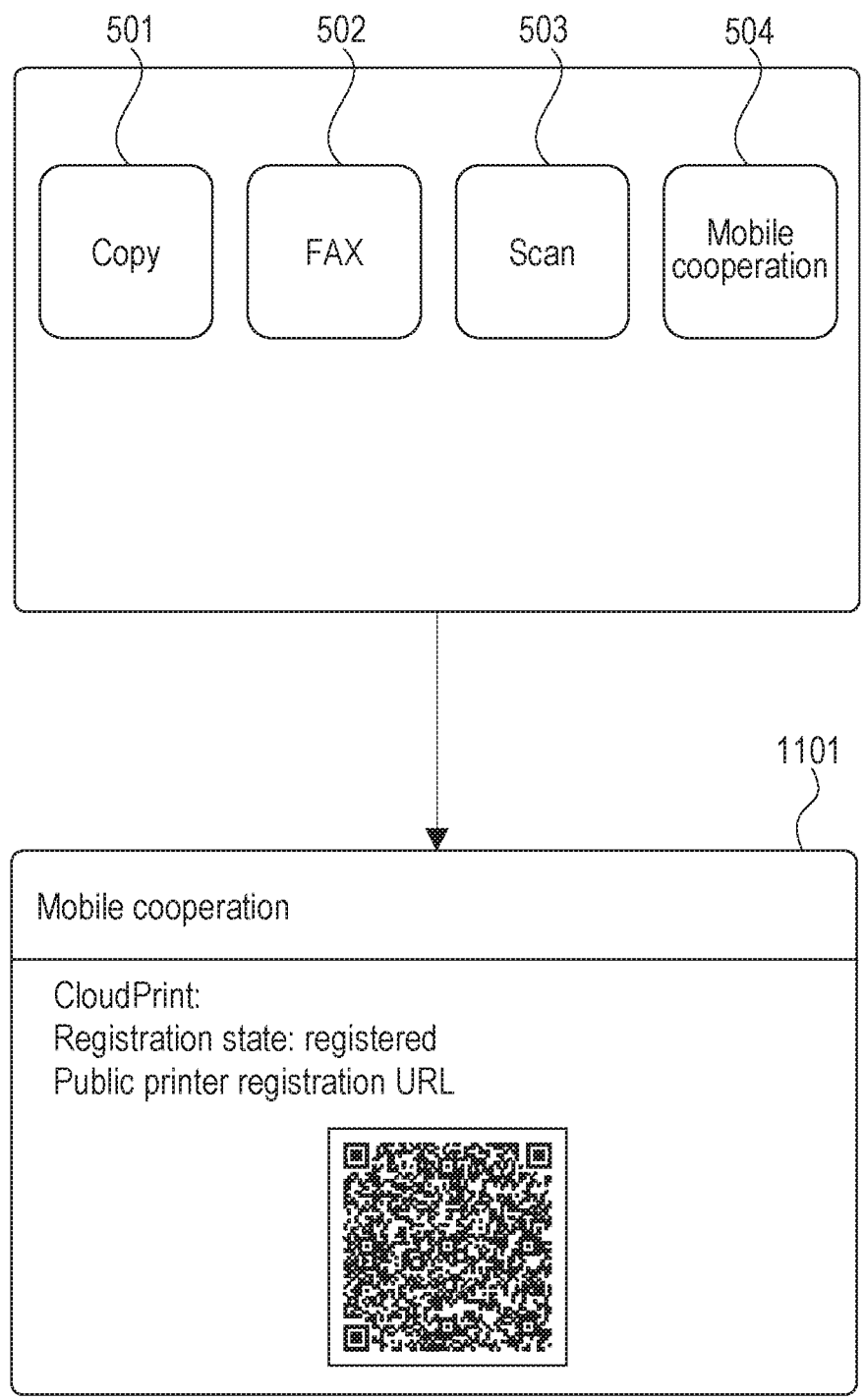
FIG. 11 illustrates an example of how the screen makes a transition in the second embodiment.

FIG. 11 illustrates an example of how the screen makes a transition when the Mobile cooperation button 504 is selected on the display panel 505 in the second embodiment.

A screen 1101 is displayed by the operation controller 400 in Step S1002 in the flowchart illustrated in FIG. 10. The cloud print registration state read out from the storage unit 405 and the printing apparatus registration URL represented by the two-dimensional code are displayed on the screen 1101.

Third Embodiment

A process to generate a new button on the operation panel of the printer when the printing apparatus 101 receives the printing apparatus state change notification 601 from the cloud print service 102 and the publication state is set to public will be described in a third embodiment.

Figure 12:
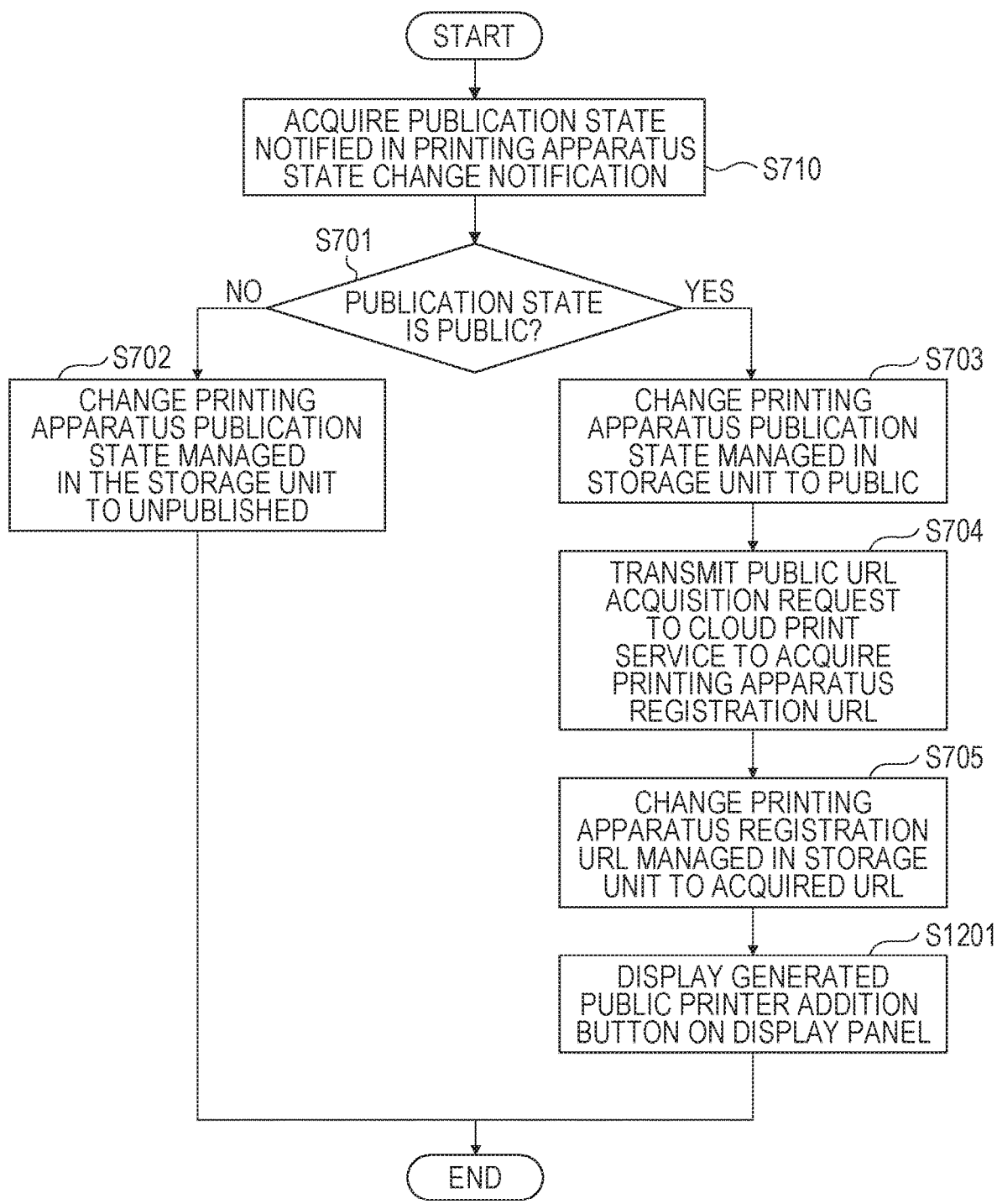
FIG. 12 is a flowchart illustrating exemplary information processing in a third embodiment.

FIG. 12 is a flowchart illustrating exemplary information processing when the Mobile cooperation button 504 is selected on the display panel 505 in the third embodiment.

Since Steps S701 to S710 are the same as those in the flowchart illustrated in FIG. 7 in the first embodiment, a description of Steps S701 to S710 is omitted herein. Step S1201 will be described in the third embodiment.

In Step S1201, the operation controller 400 generates a public printer addition button and displays the generated public printer addition button on the display panel 505.

Figure 13:
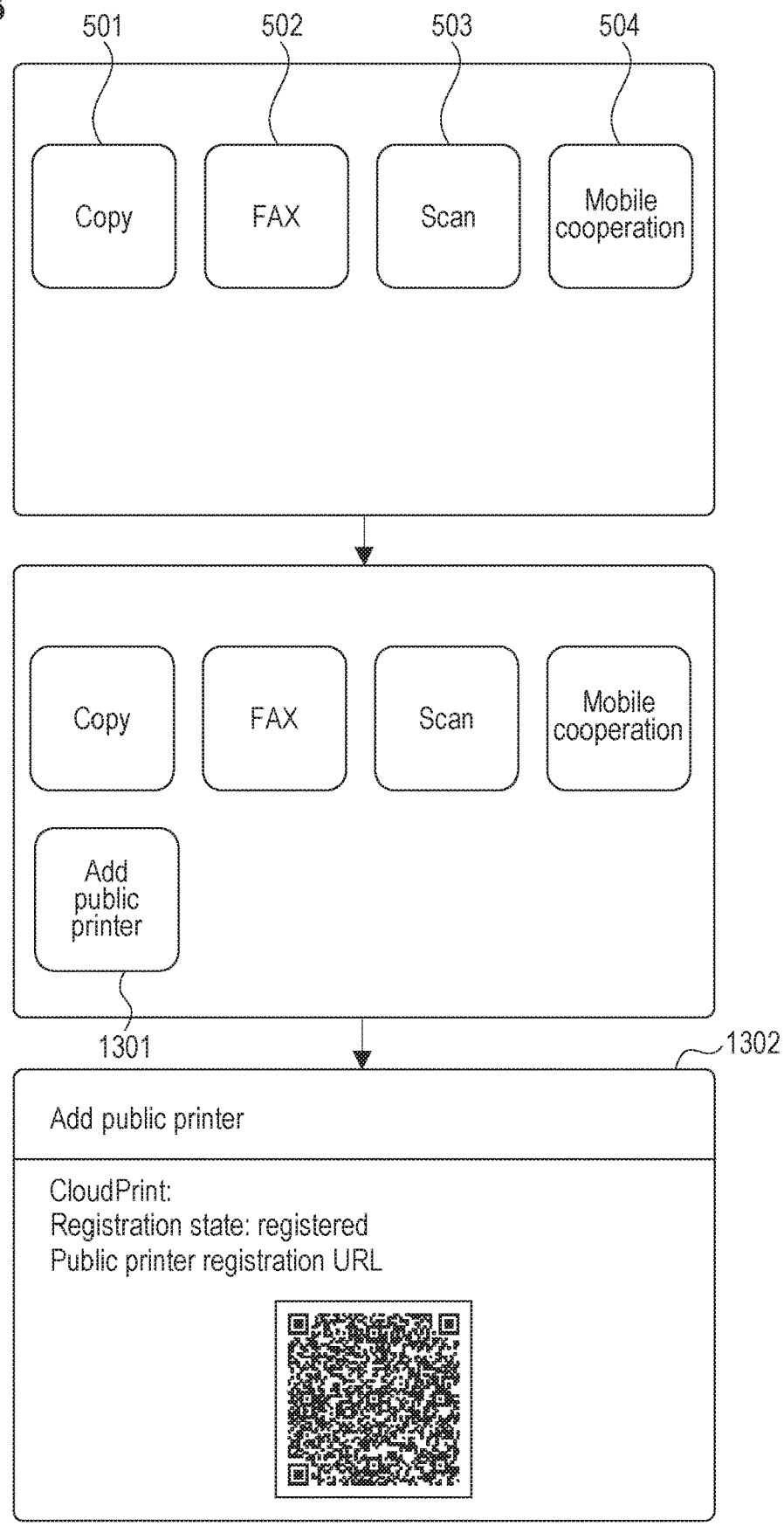
FIG. 13 illustrates an example of how the screen makes a transition when a public printer addition button is added in the third embodiment.

FIG. 13 illustrates an example of how the screen makes a transition when the public printer addition button generated on the display panel 505 is added.

An Add public printer button 1301 is the public printer addition button generated in Step S1201 described in the flowchart illustrated in FIG. 12. Upon selection of the Add public printer button 1301 by the user, the screen makes a transition to a screen 1302. The cloud print registration state read out from the storage unit 405 and the printing apparatus registration URL represented by the two-dimensional code are displayed on the screen 1302.

Fourth Embodiment

Figure 14:
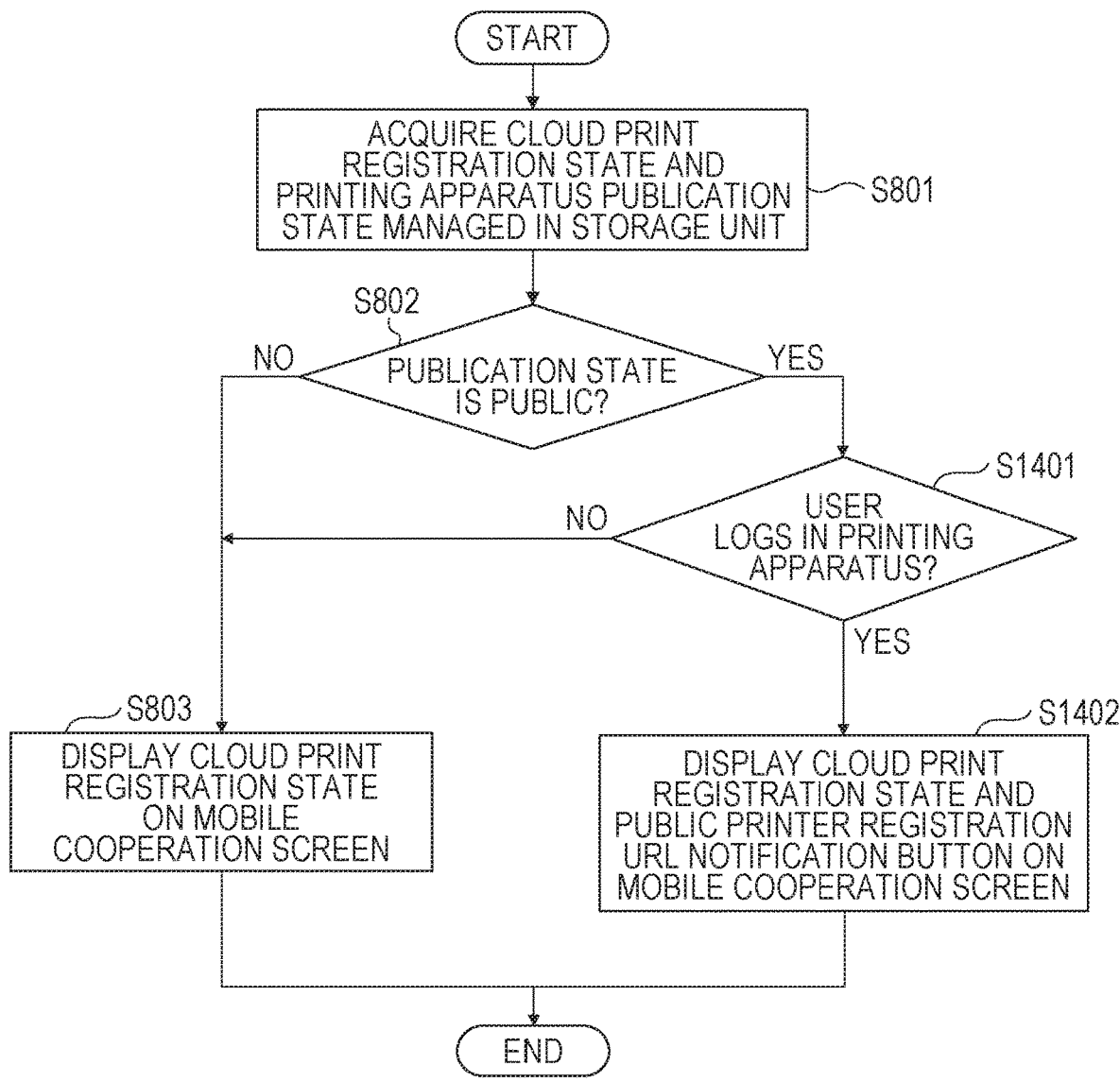
FIG. 14 is a first flowchart illustrating exemplary information processing in a fourth embodiment.

A process to transmit a URL in the first embodiment to a user using an Email will be described in a fourth embodiment. FIG. 14 is a flowchart illustrating exemplary information processing when the Mobile cooperation button 504 is selected on the display panel 505 in the fourth embodiment. Since Steps S801 to S803 are the same as those in the flowchart illustrated in FIG. 8 in the first embodiment, a description of Steps S801 to S803 is omitted herein. Steps S1401 and S1402 will be described in the fourth embodiment.

In Step S1401, the login controller 411 determines whether the user logs in the printing apparatus 101. If the login controller 411 determines that the user logs in the printing apparatus 101 (YES in Step S1401), the processing goes to Step S1402. If the login controller 411 determines whether the user does not log in the printing apparatus 101 (NO in Step S1401), the processing goes to Step S803.

In Step S1402, the operation controller 400 displays the cloud, print registration state and a public printer registration URL notification button on the mobile cooperation screen.

Figure 15:
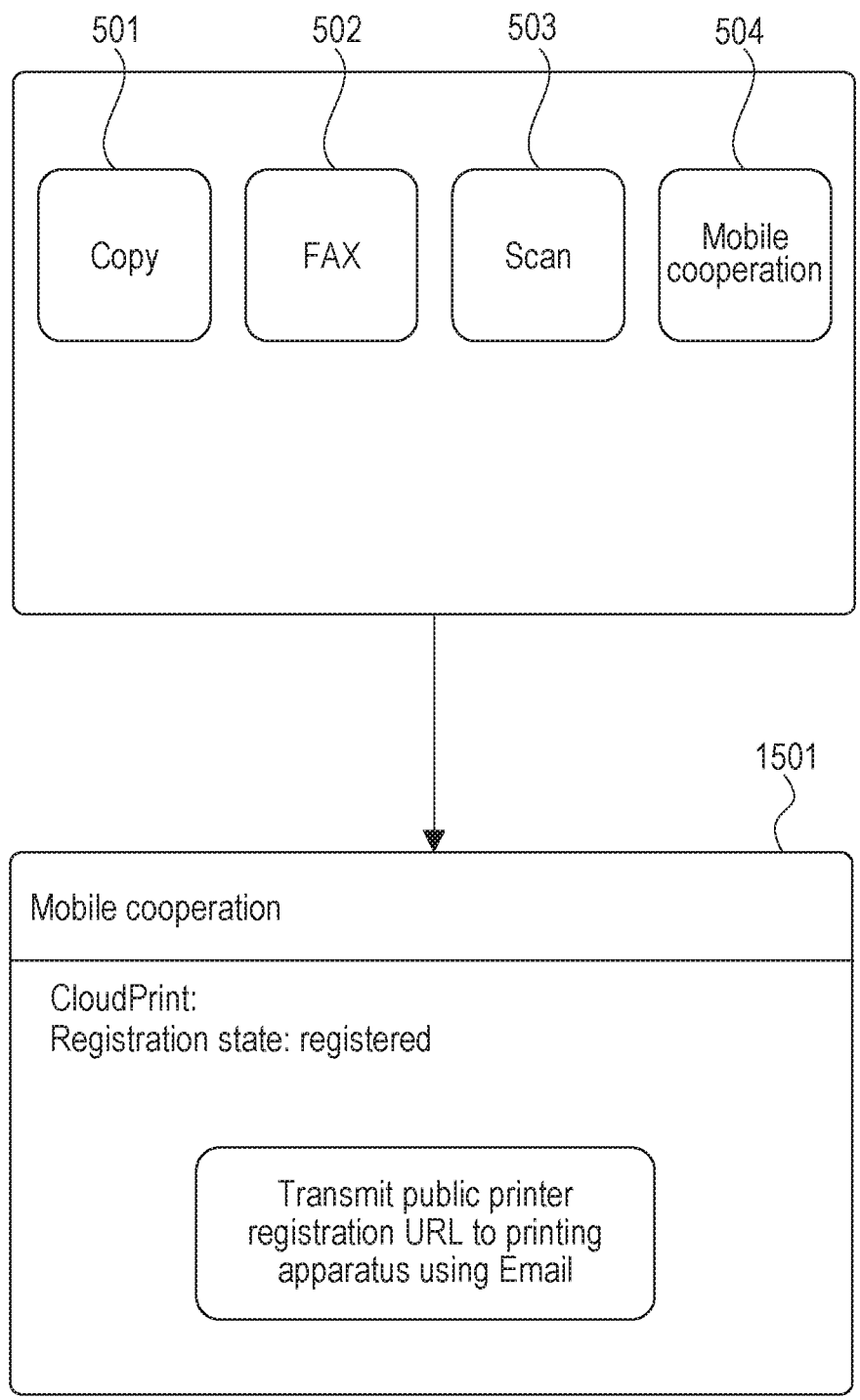
FIG. 15 illustrates an example of how the screen makes a transition in the fourth embodiment.

FIG. 15 illustrates an example of how the screen makes a transition when the Mobile cooperation button 504 is selected on the display panel 505 in the fourth embodiment.

A screen 1501 is displayed by the operation controller 400 in Step S1402 in the flowchart illustrated in FIG. 14. The cloud print registration state read out from the storage unit 405 and the public printer registration URL notification button are displayed on the screen 1501.

Figures 16, 17:
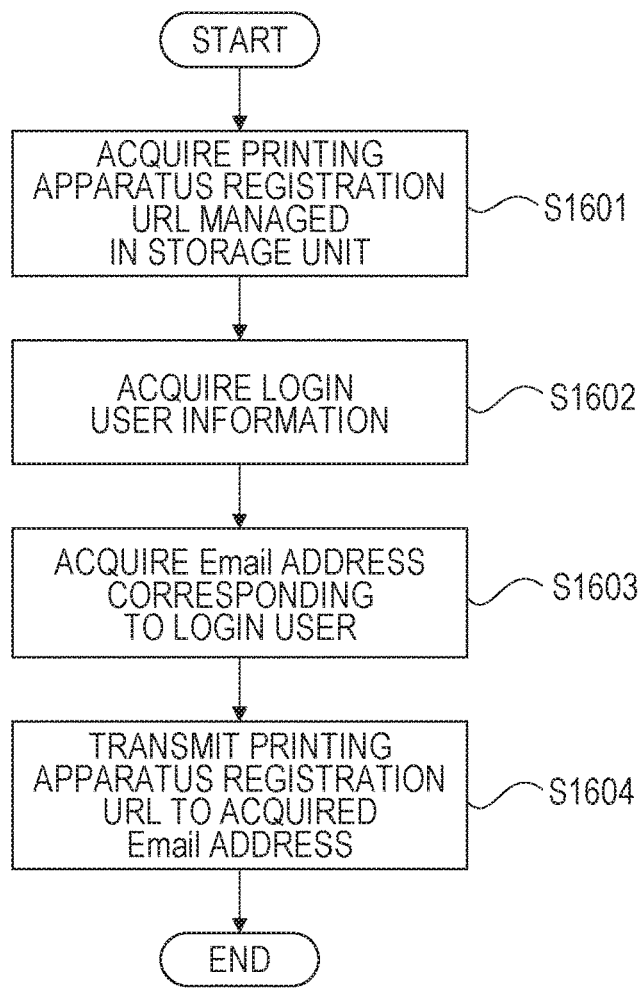
FIG. 16 is a second flowchart illustrating exemplary information processing in the fourth embodiment.
FIG. 17 illustrates an exemplary user management table.

FIG. 16 is a flowchart illustrating exemplary information processing when the public printer registration URL notification button displayed on the display panel 505 is selected.

Referring to FIG. 16, in Step S1601, the cloud print state controller 403 acquires the printing apparatus registration URL managed in the storage unit 405.

In Step S1602, the login controller 411 acquires information about the login user. In Step S1603, the user account controller 410 reads out a user management table 1703 managed in the storage unit 405 to acquire an Email address corresponding to the login user.

In Step S1604, the Email controller 412 transmits the printing apparatus registration URL to the acquired Email address.

FIG. 17 illustrates an example of the user management table managed by the printing apparatus 101. User names 1701 and Email addresses 1702 corresponding to the user names 1701 are stored in the user management table 1703. The user management table 1703 is stored in the ROM 304 or the HDD 314.

Fifth Embodiment

A process to change various public printer settings in the printing apparatus 101 in the first embodiment will be described in a fifth embodiment.

Figure 18:
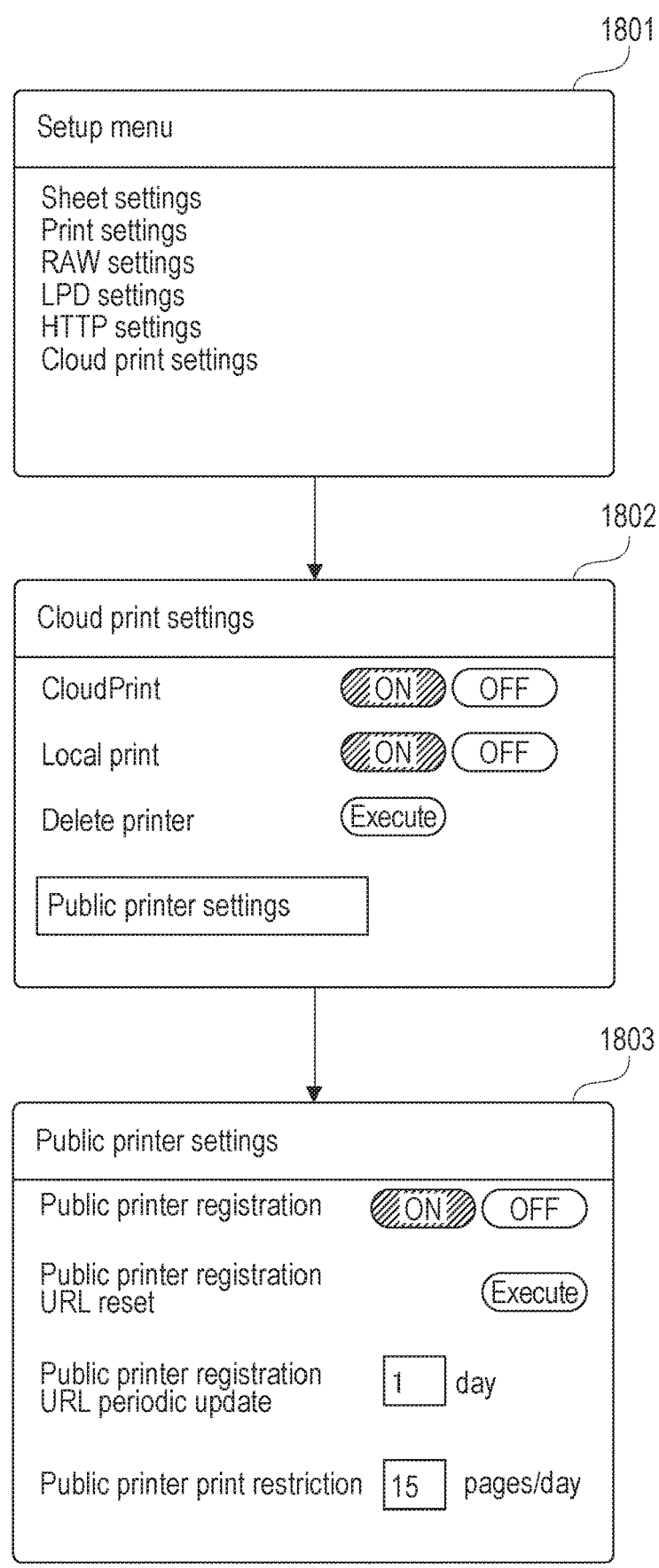
FIG. 18 illustrates an example of how the screen makes a transition in a fifth embodiment.

FIG. 18 illustrates an example of how the screen makes a transition when the user changes cloud print public printer settings in the printing apparatus 101.

A screen 1801 is displayed on the display panel 505 by the operation controller 400 upon selection of the menu button 512 in FIG. 5. Setting items used to make various settings are displayed on the screen 1801. Upon selection of Cloud print settings, the operation controller 400 displays a screen 1802 on the display panel 505. Various cloud print settings are capable of being made on the screen 1802. The user is capable of switching a cloud print function between enabled and disabled by selecting ON or OFF, respectively, in a Cloud print item. The user is capable of switching a local print function between enabled and disabled by selecting ON or OFF, respectively, in a Local print item. The user is capable of deleting the printing apparatus 101 from the cloud print service 102 by selecting an Execute button in a Delete printer item. Upon selection of a Public printer settings button, the operation controller 400 displays a screen 1803 on the display panel 505. The public printer settings are capable of being made on the screen 1803. Upon selection of OFF in a Public printer registration item, the operation controller 400 does not display a public printer registration URL on the screen 901 in FIG. 9. Upon selection of ON in the Public printer registration item, the operation controller 400 displays the public printer registration URL, as on the screen 901 in FIG. 9.

Upon selection of an Execute button in Public printer registration URL reset on the screen 1803, the cloud print state controller 403 transmits a public URL reset request to the cloud print service 102. This resets the public URL and a new public URL is transmitted from the cloud print service 102 to the printing apparatus 101. The printing apparatus 101 stores the new public URL in the storage unit 405.

Upon setting a value in Public printer registration URL periodic update on the screen 1803, the cloud print state controller 403 transmits the public URL reset request to the cloud print service 102 on a predetermined cycle. This periodically updates the public URL and the public URL that is periodically updated is transmitted from the cloud print service 102 to the printing apparatus 101. The printing apparatus 101 stores the new public URL in the storage unit 405. The value of the Public printer registration URL periodic update is an example of the interval at which the URL is controlled.

Upon setting a value in Public printer print restriction on the screen 1803, the cloud print state controller 403 transmits a public printer print restriction number change request including the value set in the cloud print service 102. Upon reception of the public printer print restriction number change request, the cloud, print service 102 changes the public printer print restriction number to the set value. This print restriction number indicates the number of prints capable of being printed from the printing apparatus 101 based on the printing instruction via the cloud print service.

Sixth Embodiment

A process performed by the printing apparatus 101 to transmit the printing apparatus registration URL 210 acquired from the cloud print service 102 as BLE beacon information will be described in a sixth embodiment.

Figure 19:
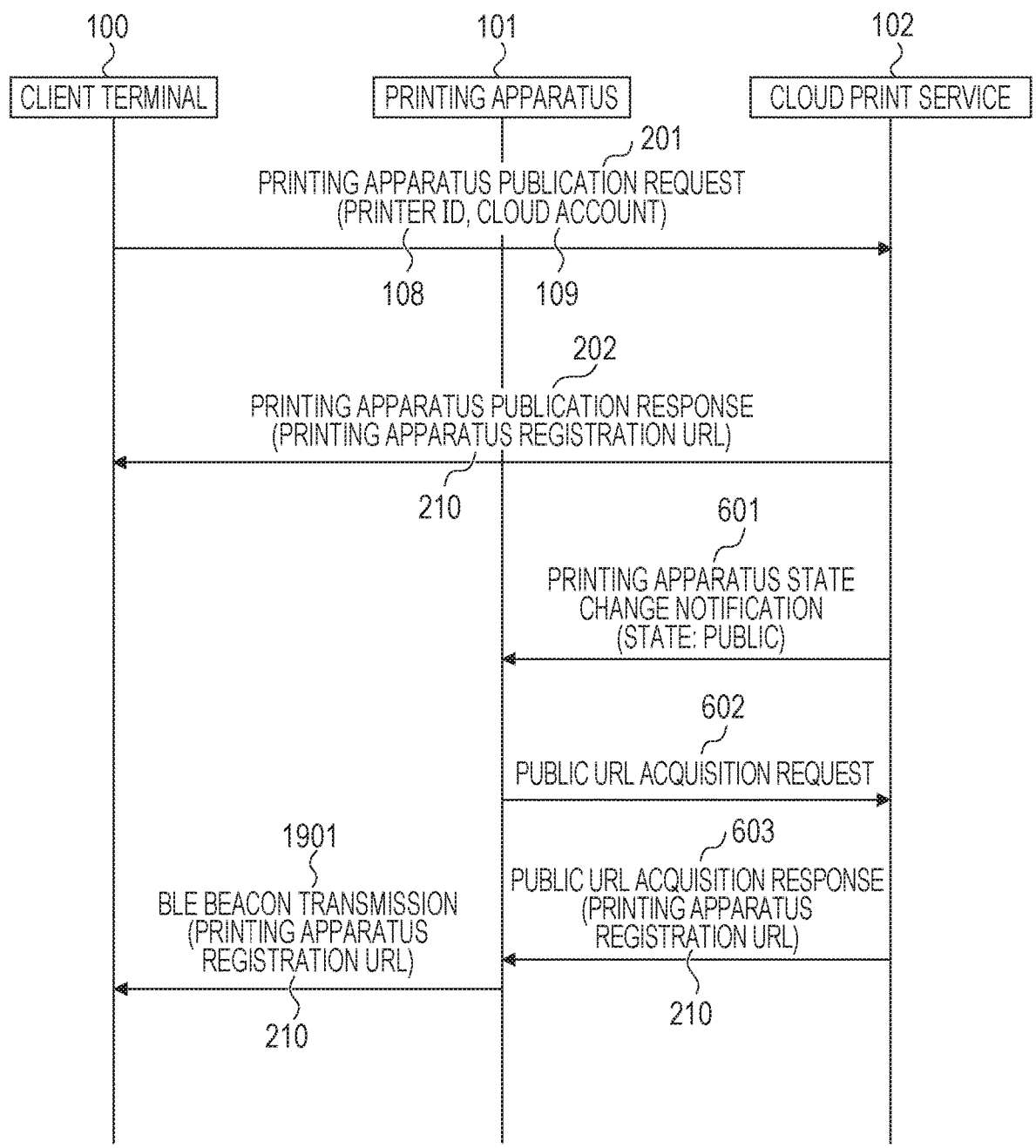
FIG. 19 is a sequence diagram illustrating an exemplary process in a sixth embodiment.

FIG. 19 is a sequence diagram illustrating an exemplary process in which the owner of the printing apparatus publishes the printing apparatus 101 as a public printer from the client terminal 100. Since Steps S201 to S603 in the sequence diagram in FIG. 19 are the same as those in the sequence diagram in FIG. 6, a description of Steps S201 to S603 is omitted herein. Step S1901 will be described in the sixth embodiment. In Step S1901, the BLE controller 408 sets the printing apparatus registration URL 210 received from the cloud print service 102 in the BLE device 331 as beacon information. The BLE controller 408 transmits the beacon information that is periodically set from the BLE device 331. A BLE supporting client terminal the printing apparatus registration URL 210.

Seventh Embodiment

A process performed by the printing apparatus 101 in the first embodiment to transmit the printing apparatus registration URL 210 acquired from the cloud print service 102 as NFC NDEF information will be described in a seventh embodiment.

Figure 20:
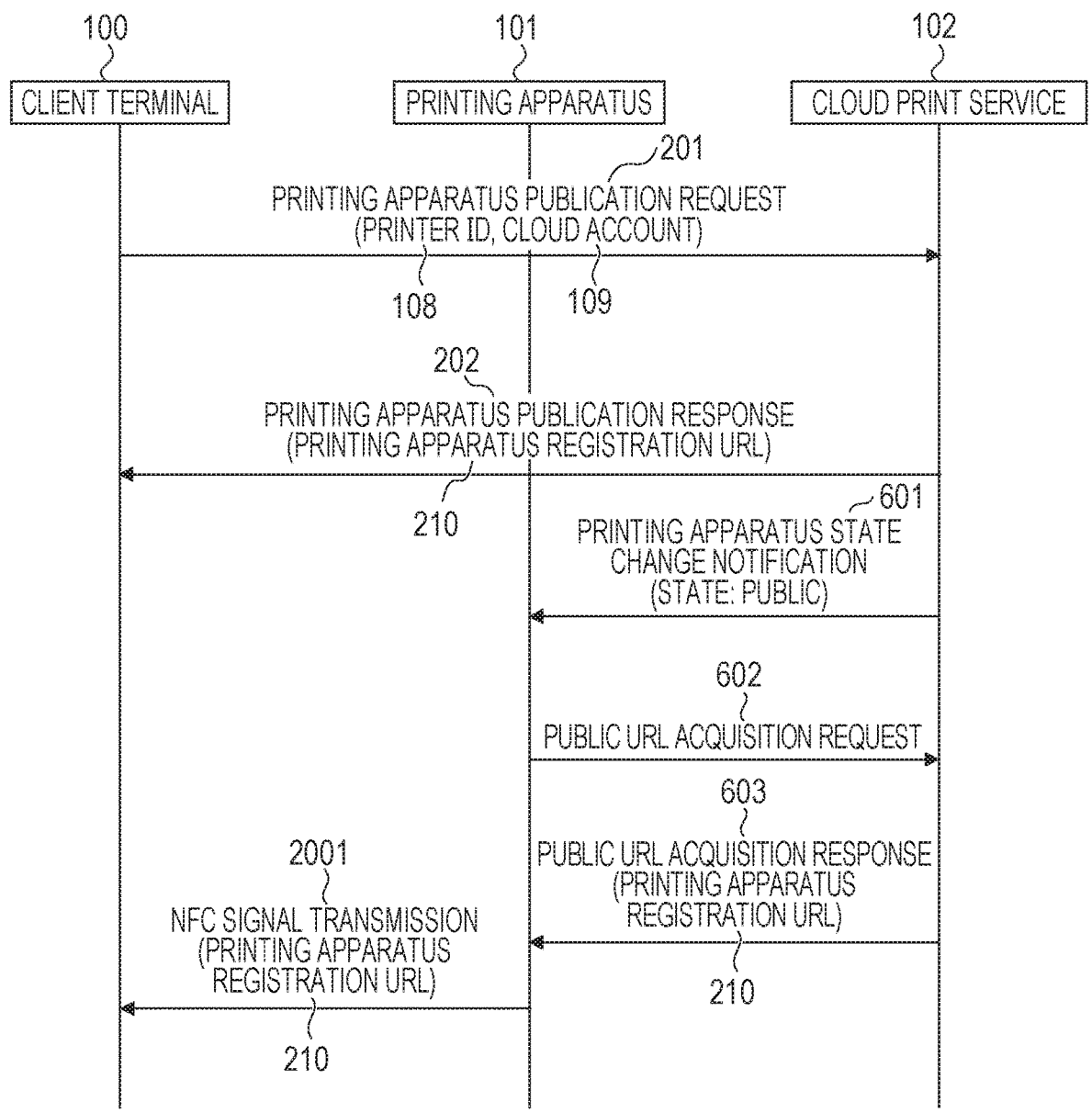
FIG. 20 is a sequence diagram illustrating an exemplary process in a seventh embodiment.

FIG. 20 is a sequence diagram illustrating an exemplary process in which the owner of the printing apparatus publishes the printing apparatus 101 as a public printer from the client terminal 100. Since Steps S201 to S603 in the sequence diagram in FIG. 20 are the same as those in the sequence diagram in FIG. 6, a description of Steps S201 to S603 is omitted herein. Step S2001 will be described in the seventh embodiment. In Step S2001, the NFC controller 409 sets the printing apparatus registration URL 210 received from the cloud print service 102 in the NFC device 341 as NDEF information. An NFC supporting client terminal is capable of reading the NDEF information to acquire the printing apparatus registration URL 210.

Eighth Embodiment

A process performed by the printing apparatus 101 to set the printing apparatus registration URL 210 based on an operation by the user will be described in an eighth embodiment.

Figure 21:
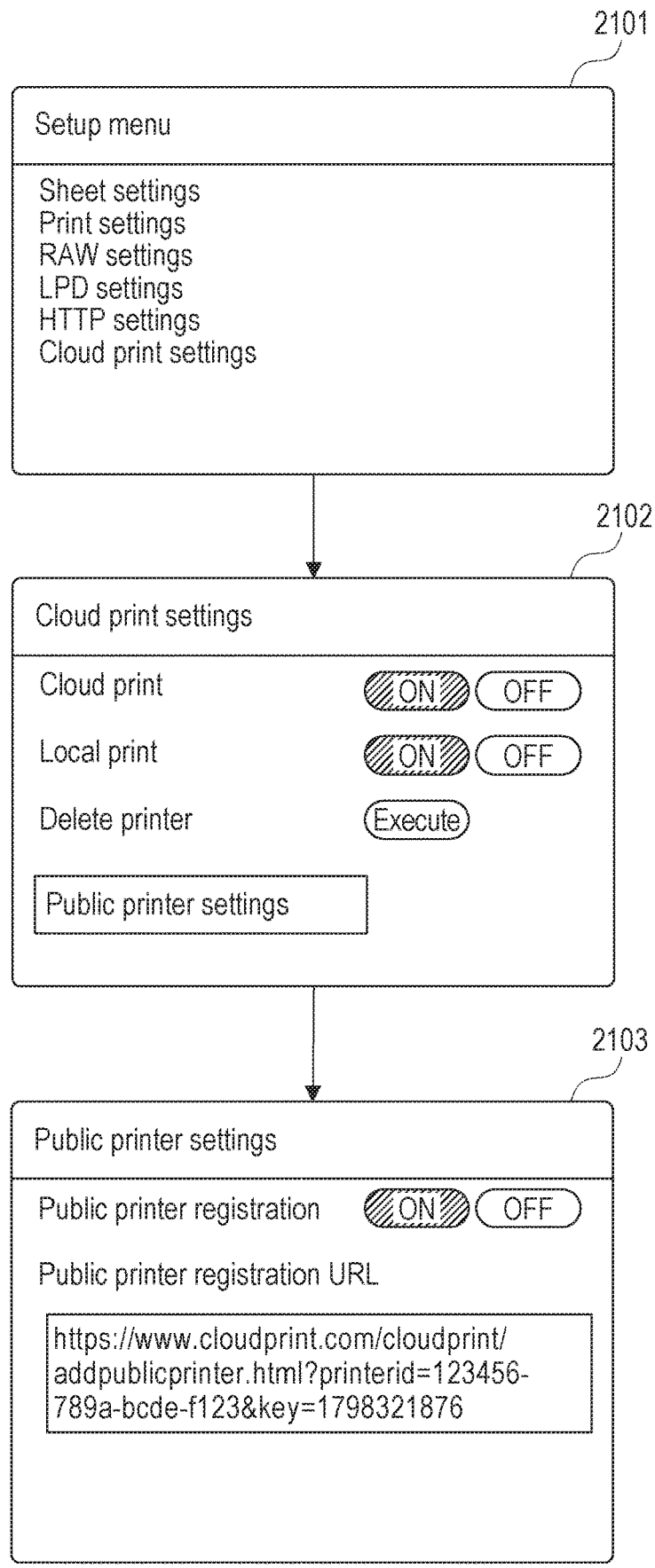
FIG. 21 illustrates an example of how the screen makes a transition in an eighth embodiment.

FIG. 21 illustrates an example of how the screen makes a transition when the user changes the cloud print public printer settings in the printing apparatus 101.

A screen 2101 is displayed on the display panel 505 by the operation controller 400 upon selection of the menu button 512 in FIG. 5. Setting items used to make various settings are displayed on the screen 2101. Upon selection of the Cloud print settings by the user, the operation controller 400 displays a screen 2102 on the display panel 505. Various cloud print settings are capable of being made on the screen 2102. The user is capable of switching the cloud print function between enabled and disabled by selecting ON or OFF, respectively, in the Cloud print item. The user is capable of switching the local print function between enabled and disabled, by selecting ON or OFF, respectively, in the Local print item. The user is capable of deleting the printing apparatus 101 from the cloud print service 102 by selecting the Execute button in the Delete printer item. Upon selection of the Public printer settings button, the operation controller 400 displays a screen 2103 on the display panel 505. The public printer settings are capable of being made on the screen 2103. Upon selection of OFF in the Public printer registration item, the operation controller 400 does not display the public printer registration URL on the screen 901 in FIG. 9. Upon selection of ON in the Public printer registration item, the operation controller 400 displays the public printer registration URL, as on the screen 901 in FIG. 9. The screen 2103 is an example of a setting screen.

A URL character string is capable of being set in a public printer registration URL field. The user sets the printing apparatus registration URL 210 acquired with the client terminal 100 in the public printer registration URL field.

The setting items set in the Setup menu are stored in the storage unit 405 by the operation controller 400.

The user may set the setting items over a network via, for example, a Web user interface (UI) of the printing apparatus 101.

The screen makes a transition in the same manner as in FIG. 9 when the Mobile cooperation button 504 is selected on the display panel 505.

In the above embodiments, when the state information indicating the state of the printing apparatus 101 indicates that the printing apparatus 101 is published in the cloud print service composed of one or more servers, a certain URL is acquired. This URL is used to issue the printing instruction to the printing apparatus via the cloud print service. The printing apparatus 101 enables the acquired URL to be output from the printing apparatus 101.

Enabling the acquired URL to be output includes display of the URL in the display in the printing apparatus 101, display of the URL as code information, transmission of the URL from the printing apparatus using an electronic mail or the like, and transmission of the URL from the printing apparatus to the client terminal using the beacon signal. In addition, enabling the acquired URL to be output includes setting of the URL in the NFC device in the printing apparatus 101 to enable a terminal apparatus to acquire the URL from the NFC device.

Other Embodiments

The present disclosure is capable of being realized by a process in which programs realizing one or more functions of the above embodiments are supplied to a system or an apparatus via a network or a recording medium and one or more processors in a computer in the system or the apparatus read out the programs for execution. The present disclosures capable of being realized by a circuit (for example, an application specific integrated circuit (ASIC)) realizing one or more functions.

Although the exemplary embodiments of the present disclosure are described above, the present disclosure is not limited to the specific embodiments.

Part or all of the software configuration of the printing apparatus 101 may be mounted in the printing apparatus 101 as a hardware configuration. The hardware configuration of the printing apparatus 101 described above is only an example and may include multiple CPUs, RAMs, ROMs, HDDs, operation panels, and so on. The multiple CPUs may perform the processes based on the programs using data or the like stored in the multiple RAMs, ROMs, and HDDs. A graphics processing unit (GPU) may be used, instead of the CPU.

The cloud print service 102 may be mounted in one server apparatus or may be mounted in a system, such as a cloud system, composed of multiple server apparatuses. When the cloud print service 102 is mounted in one server apparatus, the CPU in the server apparatus performs the processes based on the programs stored in the HDD or the like in the server apparatus to realize the cloud print service 102. When the cloud print service 102 is mounted in a cloud system, the CPU in each server apparatus composing the cloud system performs the processes based on the programs stored in the HDD or the like in each server apparatus to realize the cloud print service 102.

The client terminal 100 may at least include a CPU, a ROM, a BLE interface, an NFC interface, and so on as the hardware configuration and the CPU may perform the processes based on the programs stored in the ROM or the like to realize the functions of the client terminal 100.

The embodiments described above may be arbitrarily combined.

The cloud print described above is exemplified by, for example, Google (registered trademark) Cloud Print.

The following is enabled through the processes in the embodiments described above. Specifically, in a case in which a printing apparatus is used as a public printer in a cloud print service, a user who wants to use the printing apparatus is capable of registering the printing apparatus as a printing apparatus available for the user without making an inquiry about a URL for registering the printing apparatus to the public printer to the owner of the printing apparatus.

Embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard, disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the above has been described with reference to exemplary embodiments, it is to be understood that it is not limited to the disclosed exemplary embodiments. The scope of the following claims is to be accorded the broadest interpretation so as to encompass all such modifications and equivalent structures and functions.

This application claims the benefit of Japanese Patent Application No. 2017-135426 filed Jul. 11, 2017, which is hereby incorporated by reference herein in its entirety.

What is claimed is:

1. A printing apparatus comprising:
a memory device that stores a set of instructions; and
at least one processor that executes the set of instructions to:
transmit a registration request for registering the printing apparatus and a cloud account of an owner of the printing apparatus in association with each other to a cloud print service composed of one or more servers,
acquire, in a case where the printing apparatus is designated as a public printer by the owner after the cloud print service associates the cloud account of the owner and the printing apparatus with each other on a basis of the registration request, a uniform resource locator for registering the printing apparatus in association with a third party, and
display a screen that includes the uniform resource locator on a display of the printing apparatus,
wherein the printing apparatus is capable of receiving an instruction about whether to designate the printing apparatus as a public printer or a non-public printer, wherein a screen that includes the uniform resource locator is displayed on the display of the printing apparatus when the screen is displayed in a case where an instruction for designation as a public printer is received, and wherein a screen that does not include the uniform resource locator is displayed on the display of the printing apparatus when the screen is displayed in a case where an instruction for designation as a non-public printer is received.

2. The printing apparatus according to claim 1, wherein the at least one processor executes instructions in the memory device to:

display the acquired uniform resource locator on an operation panel.

3. The printing apparatus according to claim 2, wherein the at least one processor executes instructions in the memory device to:

convert the uniform resource locator into a code, and display the uniform resource locator converted into the code on the operation panel.

4. The printing apparatus according to claim 2, wherein the at least one processor executes instructions in the memory device to:

display a certain button on the operation panel if the state information indicates that the printing apparatus is published in the cloud print service, and display the uniform resource locator on the operation panel when the certain button is selected.

5. The printing apparatus according to claim 2, wherein the at least one processor executes instructions in the memory device to:

set display or non-display of the uniform resource locator on the operation panel, control the uniform resource locator so as to be displayed on the operation panel if display of the uniform resource locator on the operation panel is set, and control the uniform resource locator so as not to be displayed on the operation panel if non-display of the uniform resource locator on the operation panel is set.

6. The printing apparatus according to claim 1, wherein the at least one processor executes instructions in the memory device to:

determine whether the uniform resource locator is to be reset, and acquire a new uniform resource locator from the cloud print servicef it is determined that the uniform resource locator is to be reset.

7. The printing apparatus according to claim 6, wherein the at least one processor executes instructions in the memory device to:

set an interval at which the uniform resource locator is reset, and acquire a new uniform resource locator from the cloud print service at the set interval if the interval at which the uniform resource locator is reset is set.

8. The printing apparatus according to claim 1, wherein the at least one processor executes instructions in the memory device to:

set a print restriction number indicating a number of prints capable of being printed from the printing apparatus based on the printing instruction via the cloud print service, and transmit a change request including the print restriction number to the cloud print service if the print restriction number is set.

9. The printing apparatus according to claim 1, wherein the at least one processor executes instructions in the memory device to:

determine whether a user logs in the printing apparatus if the state information indicates that the printing apparatus is published in the cloud print service, and display a button used to transmit the uniform resource locator to the user on the operation panel if it is determined that the user logs in the printing apparatus.

10. The printing apparatus according to claim 9, wherein the at least one processor executes instructions in the memory device to:

transmit an electronic mail including the uniform resource locator to the user if the button used to transmit the uniform resource locator to the user is selected.

11. The printing apparatus according to claim 1, wherein the at least one processor executes instructions in the memory device to:

transmit the acquired uniform resource locator to a client terminal using a beacon signal.

12. The printing apparatus according to claim 1, wherein the at least one processor executes instructions in the memory device to set the acquired uniform resource locator in a Near Field Communication device.

13. The printing apparatus according to claim 1, wherein the at least one processor executes instructions in the memory device to:

acquire the uniform resource locator from the cloud print service.

14. The printing apparatus according to claim 13, wherein the at least one processor executes instructions in the memory device to:

acquire the uniform resource locator from the cloud print service if a publication state of the printing apparatus, indicated by the state information received from the cloud print service, indicates public.

15. The printing apparatus according to claim 1, wherein the at least one processor executes instructions in the memory device to:

acquire the uniform resource locator input on a setting screen.

16. The printing apparatus according to claim 1, wherein the uniform resource locator is used to associate the printing apparatus with a user account in the cloud print service.

17. A method of controlling a printing apparatus, the method comprising:

transmitting a registration request for registering the print apparatus and a cloud account of an owner of the printing apparatus in associated with each other to a cloud print service composed on or more servers;

acquiring, in a case where the printing apparatus is designated as a public printer by the owner after the cloud print service associates the cloud account of the owner and the printing apparatus with each other on a basis of the registration request, a uniform resource locator for registering the printing apparatus in association with a third party; and displaying a screen that includes the uniform resource locator on a display of the printing apparatus, wherein the printing apparatus is capable of receiving an instruction about whether to designate the printing apparatus as a public printer or a non-public printer, wherein a screen that includes the uniform resource locator is displayed on the display of the printing apparatus when the screen is displayed in a case where an instruction for designation as a public printer is received, and wherein a screen that does not include the uniform resource locator is displayed on the display of the printing apparatus when the screen is displayed in a case where an instruction for designation as a non-public printer is received.

18. A non-transitory computer readable storage medium storing a program for causing a computer to perform a method of controlling a printing apparatus, the method comprising:

transmitting a registration request for registering the print apparatus and a cloud account of an owner of the printing apparatus in associated with each other to a cloud print service composed on or more servers;

acquiring, in a case where the printing apparatus is designated as a public printer by the owner after the cloud print service associates the cloud account of the owner and the printing apparatus with each other on a basis of the registration request, a uniform resource locator for registering the printing apparatus in association with a third party; and displaying a screen that includes the uniform resource locator on a display of the printing apparatus, wherein the printing apparatus is capable of receiving an instruction about whether to designate the printing apparatus as a public printer or a non-public printer, wherein a screen that includes the uniform resource locator is displayed on the display of the printing apparatus when the screen is displayed in a case where an instruction for designation as a public printer is received, and wherein a screen that does not include the uniform resource locator is displayed on the display of the printing apparatus when the screen is displayed in a case where an instruction for designation as a non-public printer is received.

* * * * *